United States Patent
Kita et al.

(10) Patent No.: US 12,038,607 B2
(45) Date of Patent: Jul. 16, 2024

(54) OPTICAL ARITHMETIC UNIT

(71) Applicant: Nippon Telegraph and Telephone Corporation, Tokyo (JP)

(72) Inventors: Shota Kita, Tokyo (JP); Akihiko Shinya, Tokyo (JP); Masaya Notomi, Tokyo (JP); Kengo Nozaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 901 days.

(21) Appl. No.: 16/976,866

(22) PCT Filed: Feb. 13, 2019

(86) PCT No.: PCT/JP2019/005021
§ 371 (c)(1),
(2) Date: Aug. 31, 2020

(87) PCT Pub. No.: WO2019/167620
PCT Pub. Date: Sep. 6, 2019

(65) Prior Publication Data
US 2020/0408989 A1    Dec. 31, 2020

(30) Foreign Application Priority Data

Mar. 2, 2018 (JP) ................................. 2018-037282
Aug. 23, 2018 (JP) ................................. 2018-156024

(51) Int. Cl.
*G02B 6/12* (2006.01)
*G02B 6/125* (2006.01)
(Continued)

(52) U.S. Cl.
CPC ............. *G02B 6/125* (2013.01); *G02F 3/026* (2013.01); *G02F 7/00* (2013.01)

(58) Field of Classification Search
CPC ....... G02B 6/125; G02B 6/2804; G02F 3/026; G02F 7/00
(Continued)

(56) References Cited

U.S. PATENT DOCUMENTS 5,039,988 A    8/1991   Hong
5,157,461 A *   10/1992   Page ...................... G01C 19/72
                                                       356/462

(Continued)

FOREIGN PATENT DOCUMENTS

JP     2009544061     12/2009

OTHER PUBLICATIONS

Kita, Shota, et al., "Proposal of Low Latency Optical Digital/Analog Converter," Summary of the 65 Spring Lecture of the Japan Society of Applied Physics, Mar. 17, 2018, 2 pages.
(Continued)

*Primary Examiner* — Kaveh C Kianni
*Assistant Examiner* — Hung Q Lam
(74) *Attorney, Agent, or Firm* — Slater Matsil, LLP

(57) ABSTRACT

The output computing unit includes cascade-connected N number of Y coupling elements having two inputs and one output, and N number of optical intensity modulators. The N number of light intensity modulators individually modulate the intensity of a continuous light to a second optical input port, which is different from a first optical input port to which no light is input or to which a signal light from an optical output port of a Y coupling element in a previous stage, out of two optical input ports of each of the cascade-connected N number of Y coupling elements, in accordance with corresponding bits of an N-bit electric digital signal. The output light acquired from the Y coupling element 1-N in the final stage is regarded as the N-bit digital analog computing result.

14 Claims, 35 Drawing Sheets

(51) Int. Cl.
*G02B 6/26* (2006.01)
*G02B 6/42* (2006.01)
*G02F 3/02* (2006.01)
*G02F 7/00* (2006.01)

(58) Field of Classification Search
USPC .. 385/14–15, 18, 24, 27, 31, 37, 44, 45, 47, 385/129–132
See application file for complete search history.

(56) References Cited

U.S. PATENT DOCUMENTS 8,526,771 B2 * 9/2013 Meyer .................... G02B 6/125
385/27
2008/0018513 A1 1/2008 Frazier et al.

OTHER PUBLICATIONS

Kita, Shota, et al., "Proposal of Optical Digital/Analog Converters with Reduced Loss to Scale," The 79 Fall Scientific Lecture of the Japan Society of Applied Physics Previews, Sep. 18, 2018, 2 pages, Nagoya City, Aichi.
Yang, Lin, et al., "Demonstration of a 3-bit Digital-to-Analog Convertor Based on Silicon Microring Resonators," Optics Letters, 2014, vol. 39, No. 19, pp. 5736-5740.

* cited by examiner

OPTICAL ARITHMETIC UNIT

CROSS-REFERENCE TO RELATED APPLICATIONS

This application is a national phase entry of PCT Application No. JP2019/005021, filed on Feb. 13, 2019, which claims priority to Japanese Patent Application No. 2018-037282, filed on Mar. 2, 2018 and Japanese Patent Application No. 2018-156024, filed on Aug. 23, 2018, which applications are hereby incorporated herein by reference.

TECHNICAL FIELD

The present invention relates to an optical computing unit, such as an optical digital-to-analog convertor (DAC) using optical circuits.

BACKGROUND

Various types of digital-to-analog convertors (DAC convertors) using electric circuits have been proposed, which have a different performance in terms of sampling rate, resolution, power consumption, size and the like. In other words, at the moment, different types of DACs are selected and used depending on intended use. For example, in the case of currently commercialized DACs, about a 1 GS/s sampling rate is regarded as high-speed, and a 16 (B)it or higher resolution is regarded as high resolution. As communication and imaging techniques advance in future, higher speeds, higher resolutions, lower power consumptions and smaller sizes will be demanded for DACs. Latency (delay) of current high resolution DACs will also be a bottleneck in future.

To meet such demands, an optical DAC using optical circuits has been proposed (see NPL 1).

However, a problem with conventional optical DACs is that speed is controlled by electric circuits since a part of an optical DAC is operated by the electric circuits. Another problem is that an enormous number of elements and a large circuit scale are required.

CITATION LIST

Non Patent Literature

[NPL 1] L. Yang, et al. "Demonstration of a 3-bit Optical Digital-to-Analog Convertor Based on Silicon Micro-ring Resonators", Optics Letters, Vol. 39, No. 19 (2014): pp. 5736-5739

SUMMARY

Technical Problem

With the foregoing in view, it is an object of embodiments of the present invention to provide an optical computing unit that is fast, and that can be mounted at high density.

Means for Solving the Problem

An optical computing unit of embodiments of the present invention includes: cascade-connected N number (N is 2 or greater integer) of at least one type of elements out of first Y coupling elements having two inputs and one output of which input is one or two signal lights, and a Y coupling/Y branching element having two inputs and two outputs of which input is one or two signal lights; and N number of optical modulators that individually modulate a continuous light to a second optical input port, which is different from a first optical input port to which no light is input or a first optical input port to which a signal light from an optical output of an element in a previous stage is input, out of two optical input ports of each one of N number of cascade-connected elements, in accordance with corresponding bits of an N-bit electric digital signal, so as to generate signal lights to the second optical input port. The output light acquired from the element in the final stage is regarded as the computing result.

A configuration example of the optical computing unit of embodiments of the present invention includes the N number of first Y coupling elements. The N number of first Y coupling elements are cascade-connected so that: (N−1) number of first Y coupling elements, not including the first Y coupling element at the most upstream side, enable the lights output from the optical output ports of the first Y coupling elements at the upstream side to be the input lights to the first optical input ports; and the N number of Y coupling elements, including the first Y coupling element at the most upstream side, enable the signal lights modulated by the N number of optical modulators to be the input lights to the second optical input ports. The N number of optical modulators individually modulate the N number of continuous lights having the same wavelength, in accordance with the corresponding bits of the N-bit electric digital signal so as to generate signal lights to the second optical input ports of the N number of first Y coupling elements. The output light acquired from the first Y coupling element in the final stage is regarded as the N-bit digital analog computing result.

A configuration example of the optical computing unit of embodiments of the present invention includes the (N−1) number of Y coupling/Y branching elements and one first Y coupling element. The (N−1) number of Y coupling/Y branching elements and one first Y coupling element are cascade-connected so that: an (N−2) number of Y coupling/Y branching elements, not including the Y coupling/Y branching element at the most upstream side, and the one first Y coupling element enable the lights output from the first optical output ports of the Y coupling/Y branching elements at the upstream side to be the input lights to the first optical input ports; and the (N−1) number of Y coupling/Y branching elements, including the Y coupling/Y branching element at the most upstream side, and the one first Y coupling element enable the signal lights modulated by the N number of optical modulators to be the input light to the second optical input ports. The N number of optical modulators individually modulate N number of continuous lights having the same wavelength, in accordance with the corresponding bits of the N-bit electric digital signal so as to generate signal lights to the second optical input ports of the (N−1) number of Y coupling/Y branching elements and the second optical input port of the one first Y coupling element. The output light acquired from a second optical output port, which is different from a first optical output port to output a signal light to an element in the subsequent stage, out of the two optical output ports of each of the (N−1) number of Y coupling/Y branching elements, and an output light acquired from the first Y coupling element at the final stage are regarded as the 1 to N-bit digital analog computing result.

A configuration example of the optical computing unit of embodiments of the present invention includes the N number of Y coupling/Y branching elements. The N number of Y coupling/Y branching elements are cascade-connected so that: an (N−1) number of Y coupling/Y branching elements, not including the Y coupling/Y branching element at the most upstream side, enable the lights output from the first optical output ports of the Y coupling/Y branching elements at the upstream side to be the input lights to the first optical input ports; and the N number of Y coupling/Y branching elements, including the Y coupling/Y branching element at the most upstream side, enable the signal lights modulated by the N number of optical modulators to be the input lights to the second optical input ports. The N number of optical modulators individually modulate N number of continuous lights having the same wavelength, in accordance with the corresponding bits of the N-bit electric digital signal so as to generate signal lights to the second optical input ports of the N number of Y coupling/Y branching elements. Cascade-connected (N−1) number of second Y coupling elements having two inputs and one output are further included. A signal light acquired from a second optical output port, which is different from a first optical output port that outputs a signal light to the Y coupling/Y branching element in the subsequent stage, out of the two optical output ports of the Y coupling/Y branching element in the first stage, is input to the first optical input port of the second Y coupling element in the first stage; a signal light acquired from an optical port of the second Y coupling element in the (k−1)th stage (k is an integer in a 2 to (N−1) range) is input to the first optical input port of the second Y coupling element in the k-th stage; and a signal light acquired from the second optical output port of the Y coupling/Y branching element in the (j+1)th stage (j is an integer in a 1 to (N−1) range) is input to the second optical input port of the second Y coupling element. The output light acquired from the first optical output port of the Y coupling/Y branching element in the final stage is regarded as the N-bit digital analog computing result, and the output light acquired from the second Y coupling element in the final stage is regarded as the N-bit counter computing result.

A configuration example of the optical computing unit of embodiments of the present invention includes the N number of first coupling elements. The N number of first Y coupling elements are cascade-connected so that: an (N−1) number of first Y coupling elements, not including the first Y coupling element at the most upstream side, enable the lights output from the optical output ports of the first Y coupling elements at the upstream side to be the input lights to the first optical input ports; and the N number of first Y coupling elements, including the first coupling element at the most upstream side, enable the signal lights modulated by the N number of optical modulators to be the input lights to the second optical input ports. An N number of Y branching elements having one input and two outputs are further included. The N number of Y branching elements are cascade-connected so that each of the Y branching elements, not including the Y branching element at the most upstream side, of which input is a single continuous light, enables the light output from the first optical output port, out of the two optical output ports of the Y branch element at the upstream side to be input. The output lights acquired from the second optical output ports of the N number of Y branching elements are enabled to be the input lights to the N number of optical modulators. The output light acquired from the first Y coupling element in the final stage is regarded as the N-bit digital analog computing result.

In a configuration example of the optical computing unit of embodiments of the present invention, at least one of the first Y coupling elements or at least one of the Y coupling elements constituting the Y coupling/Y branching elements has a bias port to which a bias light having a fixed intensity is input, besides the first and second optical input ports.

Further, a configuration example of the optical computing unit of embodiments of the present invention further includes a Y coupling element that enables the output light acquired from the element in the final stage to be the input light to the first optical input port, and enables the bias light having a fixed intensity to be the input light to the second optical input port. The output light acquired from this Y coupling element is regarded as the N-th bit digital analog computation.

In a configuration example of the optical computing unit of embodiments of the present invention, the optical modulator is an optical intensity modulator.

In a configuration example of the optical computing unit, the optical modulator is an optical phase modulator. A coherent detection unit that extracts electric signals after the digital analog conversion is further included. The coherent detection unit further includes: a phase shifter that adjusts the phase difference between the output light, which is the N-bit digital analog computing result, and the reference light of which wavelength is the same as the output light, to be $\pi/2$; a coupler that couples the output light, which is the N-bit digital analog computing result, and the reference light, equally divides the coupled light into two, and outputs the divided lights; a first photo detector that converts one of the output lights of the coupler into an electric signal; a second photodetector that converts the other of the output lights of the coupler into an electric signal; and a subtracter that determines the difference between the two electric signals output from the first and second photodetectors.

Effects of Embodiments of the Invention

According to embodiments of the present invention, N number of at least one type of elements, out of the first Y coupling elements having two inputs and one output, of which input is one or two signal lights, and Y coupling/Y branching elements having two inputs and two outputs, of which input is one or two signal lights, are cascade-connected, and N number of optical modulators, that individually modulate a continuous light to a second optical input port of each one of the cascade-connected N number of elements, in accordance with the corresponding bits of the N-bit electric digital signal, are disposed, whereby an optical computing unit, such as an optical DAC, that is fast and can be mounted at high density, can be implemented.

DETAILED DESCRIPTION OF ILLUSTRATIVE EMBODIMENTS

Embodiment 1

Figure 1:
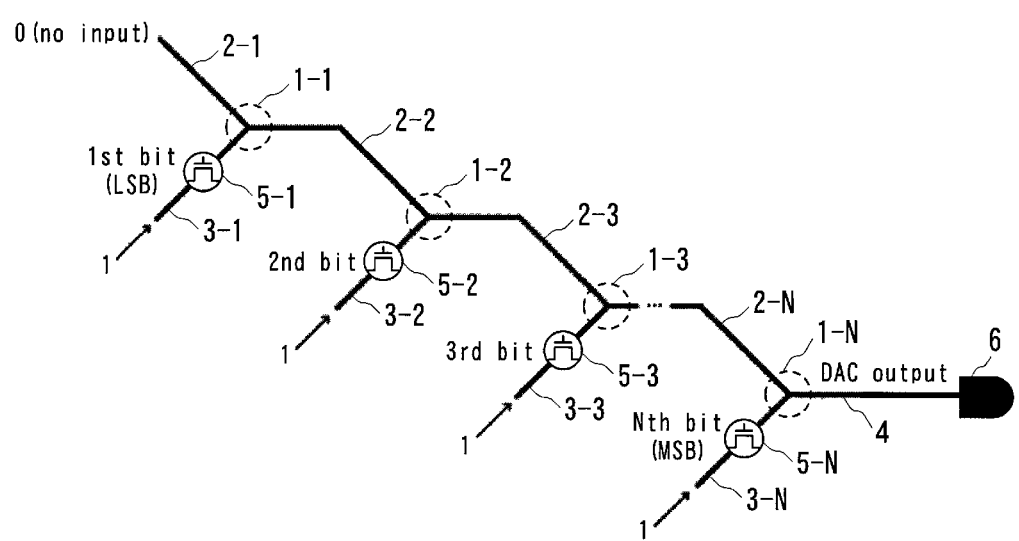
FIG. 1 is a block diagram depicting a configuration of an N-bit optical DAC according to Embodiment 1 of the present invention.

Embodiments of the present invention will be described with reference to the drawings. FIG. 1 is a block diagram depicting a configuration of an N-bit DAC, which is an optical computing unit according to Embodiment 1 of the present invention. The N-bit optical DAC is constituted of: cascade-connected N number of Y coupling elements 1-1 to 1-N (N is 2 or greater integer) having two inputs and 1 output; an optical waveguide 2-1 that is connected to one optical input port of the Y coupling element 1-1 in the first stage; an optical waveguide 2-M (M is an integer in a 2 to N range) that connects an optical output port of a Y coupling element 1-(M−1) in the (M−1)th stage and one optical input port of a Y coupling element 1-M in the Mth stage, so as to input the signal light output from the Y coupling element 1-(M−1) to the Y coupling element 1-M; optical wave guides 3-1 to 3-N that are connected to the other optical input ports of the Y coupling elements 1-1 to 1-N respectively; an optical waveguide 4 that is connected to the optical output port of the Y coupling element 1-N in the final stage; and optical intensity modulators 5-1 to 5-N (optical modulators) disposed in the optical waveguides 3-1 to 3-N respectively.

For the Y coupling elements 1-1 to 1-N and the optical waveguides 2-1 to 2-N, 3-1 to 3-N and 4, a dielectric optical wire, such as a planar lightwave circuit (PLC) or a semiconductor optical wiring, such as an Si wire, can be used respectively.

Continuous lights having the same wavelength and same intensity are input to the optical waveguides 3-1 to 3-N respectively. To input this continuous light, a continuous laser light emitted from a continuous laser light source is equally divided into N by a 1:N splitter, and the divided light is input to each optical waveguide 3-1 to 3-N respectively.

The optical waveguide 2-1 corresponds to zero input. That is, light is not input to the optical waveguide 2-1. The optical input to the optical waveguide 3-1 (i is an integer in a 1 to N range) corresponds to the input of the i-th bit (i is an integer in a 1 to N range). In other words, the optical input to the optical waveguide 3-1 corresponds to the least significant bit (LSB), and the optical input to the optical waveguide 3-N corresponds to the most significant bit (MSB).

For each optical intensity modulator 5-1 to 5-N which is disposed for each bit of the N-bit electric digital signal, a variable optical attenuator (VOA) can be used. Each of the optical intensity modulators 5-1 to 5-N interrupts the continuous light propagating each optical waveguide 3-1 to 3-N respectively if the corresponding bit input of the electric digital signal is "0", and allows the continuous light to pass if the bit input is "1". Thereby the continuous light that propagates through each optical waveguide 3-1 to 3-N is individually turned ON/OFF in accordance with the corresponding bit of the N-bit electric digital signal respectively. In this way, the signal light to be input to the other optical input port of each Y coupling element 1-1 to 1-N is generated.

The Y coupling element 1-$i$ (i=1 to N) couples the propagating lights in the optical waveguide 2-$i$ and the optical waveguide 3-$i$ at equal ratios, and outputs the coupled light. At this time, the transmittance T of the light, which was input from each of the two optical input ports of the Y coupling element 1-$i$ to the optical output port of the Y coupling element 1-$i$, is 0.25 respectively. Instead of the Y coupling element 1-1 in the first stage, a fixed optical attenuator, of which loss is 6 dB, may be disposed so that the light propagating through the optical waveguide 3-1 attenuates by 6 dB and is introduced to the optical waveguide 2-2. Alternatively, the input and output of the optical intensity modulator 5-1 may be adjusted so that the relative intensity of the output light, with respect to the input light, becomes 0.25.

It is preferable to adjust such that the phase of the input light from the optical waveguide 2-$i$ to the Y coupling element 1-$i$ and the phase of the input light from the optical waveguide 3-$i$ to the Y coupling element 1-$i$ become a same phase. To implement this adjustment, it is preferable to dispose a phase shifter in each optical waveguide 3-1 to 3-N respectively. Examples of this phase shifter are: a heater type phase shifter which controls the phase of the guided light by changing the refractive index of the optical waveguide by the thermo-optical effect; and a phase shifter that controls the phase of the guided light by changing the refractive index of the optical waveguide by the electro-optical effect.

By the above configuration, the final optical output (DAC output) of the N-bit optical DAC is acquired from the optical waveguide 4.

Figure 2:
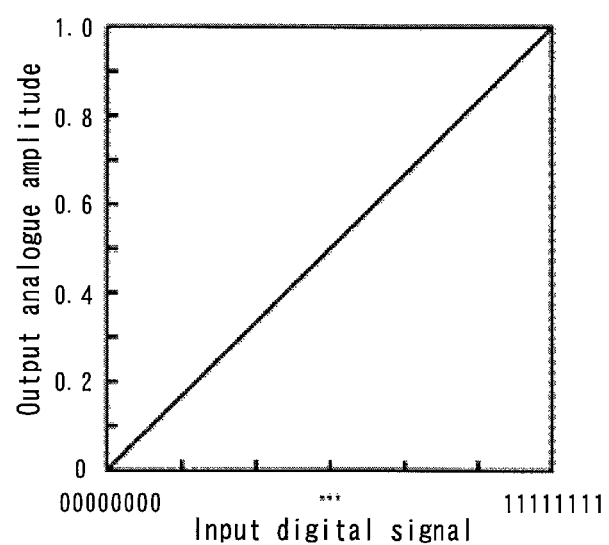
FIG. 2 is a graph depicting an input/output characteristic of the N-bit optical DAC according to Embodiment 1 of the present invention.

FIG. 2 indicates an example of the numeric calculation of the input/output characteristic of the configuration in FIG. 1 (N=8). The abscissa in FIG. 2 indicates an electric digital signal; and the ordinate indicates the normalized value of the amplitude of the optical output of the N-bit optical DAC, and the amplitude values of the optical output of the N-bit optical DAC, with respect to all combinations of the electric digital signals ("00000000" to "11111111"), are plotted.

According to FIG. 2, the amplitude value of the optical output linearly increases as the digital input value increases, that is, the N-bit optical DAC is operating normally. The maximum optical output amplitude value in the case where all input bits are "1" is $((2^N-1)/2^N)^{1/2}$ to 1. Since the total value of the optical input is N, the loss $L_{DAC}$ caused by the computation of the optical DAC is $10 \log_{10} (N/(2^N-1)2^N))$ to $10 \log_{10} (N)$ [dB].

Embodiment 2

Figure 3:
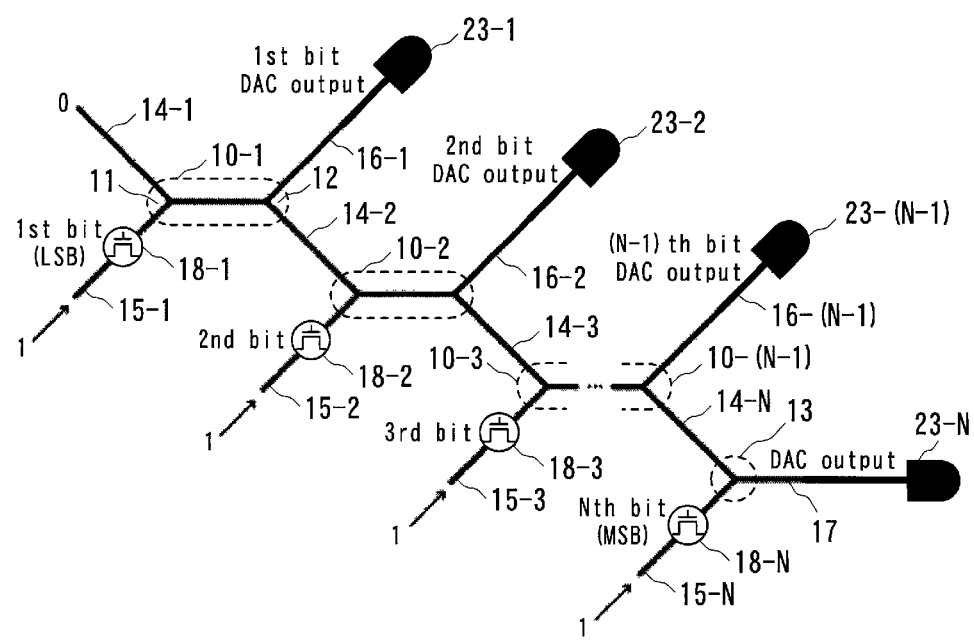
FIG. 3 is a block diagram depicting a configuration of an N-bit optical DAC according to Embodiment 2 of the present invention.

Embodiment 2 of the present invention will be described next. FIG. 3 is a block diagram depicting a configuration of an N-bit optical DAC, which is an optical computing unit according to Embodiment 2 of the present invention. The N-bit optical DAC of Embodiment 2 is constituted of: a cascade-connected (N−1) number of Y coupling/Y branching elements 10-1 to 10-(N−1) having two inputs and two outputs; a Y coupling element 13 of which one input is one optical output of the Y coupling/Y branching element 10-(N−1) in the final stage; an optical waveguide 14-1 that is connected to one optical input port of the Y coupling/Y branching element 10-1 in the first stage; an optical waveguide 14-$k$ (k is an integer in 2 to (N−1) range) that connects one optical output port of the Y coupling/Y branching element 10-($k$−1) in the ($k$−1)th stage and one optical input port of the Y coupling/Y branching element 10-($k$−1) in the k-th stage, and inputs the signal light output from the Y coupling/Y branching element 10-($k$−1) to the Y coupling/Y branching element 10-$k$; an optical waveguide 14-N that connects one optical output port of the Y coupling/Y branching element 10-(N−1) in the final stage and one optical input port of the Y coupling element 13; optical waveguides 15-1 to 15-N that are connected to the other input ports of the Y coupling/Y branching elements 10-1 to 10-(N−1) and the Y coupling element 13 respectively; optical waveguides 16-1 to 16-(N−1) that are connected to the other optical output ports of the Y coupling/Y branching elements 10-1 to 10-(N−1) respectively; an optical waveguide 17 that is connected to the optical output port of the Y coupling element 13 in the final stage; and optical intensity modulators 18-1 to 18-N (optical modulators) disposed in the optical waveguides 15-1 to 15-N respectively.

Each Y coupling/Y branch element 10-1 to 10-(N−1) is constituted of the Y coupling element 11 having two inputs and one output, and the Y branching element 12 of which input is the optical output of the Y coupling element 11.

The Y coupling element 11 of each Y coupling/Y branching element 10-$j$ (j is an integer in a 1 to (N−1) range) couples the propagating lights in the optical waveguide 14-$j$ and the optical waveguide 15-$j$ at equal ratios, and outputs the coupled light. At this time, the transmittance $T_{11}$ of the light, which was input to each of the two optical input ports of the Y coupling element 11, propagated to the optical output port of the Y coupling element 11 is 0.5 respectively.

The Y branching element 12 of each Y coupling/Y branching element 10-$j$ (j=1 to (N−1)) divides the input light from the Y coupling element 11 equally into 2. At this time, the transmittance $T_{12}$ of the light, which was input to the optical input port of the Y branching element 12, propagated to the two optical output ports of the Y branching element 12 is 0.5 respectively.

Similarly in Embodiment 1, continuous lights having the same wavelength and the same intensity are input to the optical waveguides 15-1 to 15-N respectively. The optical input to the optical waveguide 15-$i$ (i=1 to N) corresponds to the input of the i-th bit.

Similarly to Embodiment 1, each of the N number of optical intensity modulators 18-1 to 18-N interrupts the continuous light propagating each optical waveguide 15-1 to 15-N respectively if the bit input of the corresponding electric digital signal is "0", and allows the continuous light to pass if the bit input is "1". Thereby the signal light to be input to the other optical input port of each Y coupling/Y branching element 10-1 to 10-(N−1) and the Y coupling element 13 is generated.

Similarly to Embodiment 1, it is preferable to adjust such that the phase of the input light from the optical waveguide 14-*j* to the Y coupling/Y branching element 10-*j* and the phase of the input light from the optical waveguide 15-*j* to the Y coupling/Y branching element 10-*j* become a same phase, and to adjust such that the phase of the input light from the optical waveguide 14-N to the Y coupling element 13 and the phase of the input light from the optical waveguide 15-N to the Y coupling element 13 becomes a same phase. To implement this adjustment, it is preferable to dispose a phase shifter in each optical waveguide 15-1 to 15-N respectively.

By the above configuration, the final optical output (DAC output) of the N-bit optical DAC is acquired from the optical waveguide 17.

Further, in Embodiment 2, the Y branching element 12 is disposed in each Y coupling/Y branching element 10-1 to 10-(N−1) respectively, which means that (N−1) number of optical output ports are additionally disposed. In other words, the optical output of each optical waveguide 16-1 to 16-(N−1) corresponds to the DAC output of each 1 to (N−1) bit respectively.

Figure 4:
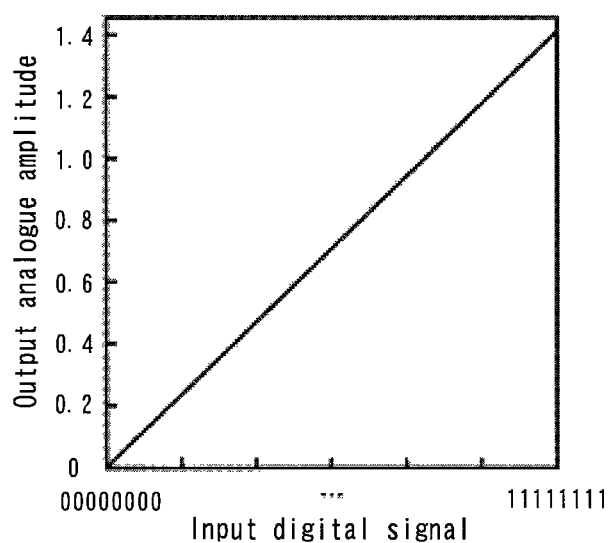
FIG. 4 is a graph depicting an input/output characteristic of the N-bit optical DAC according to Embodiment 2 of the present invention.

FIG. 4 indicates an example of the numeric calculation of the input/output characteristic of the configuration in FIG. 3 (N=8). According to FIG. 4, just like Embodiment 1, the N-bit optical DAC is operating normally. In Embodiment 2, the maximum optical output amplitude value is $((2^N-1)/2^{N-1})^{1/2}$ to $\sqrt{2}$ in the case where all input bits are "1".

Advantages of Embodiment 2, over the configuration of Embodiment 1, are as follows.

(A) Regardless the number of bits N, the loss $L_{DAC}$ caused by the computation of the optical DAC is 3 dB. In Embodiment 2, the maximum optical output amplitude value is up to $\sqrt{2}$, as mentioned above, which means that the optical output is larger than Embodiment 1.

(B) The Y coupling/Y branching element of which T is up to 0.5 has lower reflectance, and is more easily designed than Embodiment 1. The Y coupling elements 1-1 to 1-N with T=0.25, which are required for the configuration of Embodiment 1, are not standard elements, and in some cases the reflectance of the light may increase. On the other hand, in the case of the Y coupling/Y branching elements 10-1 to 10-(N−1) and the Y coupling element 13 with T=0.5, a design method which can implement low loss, low reflectance and easy fabrication is already available.

(C) DACs having a low number of bits can be simultaneously generated. In Embodiment 2, 1 to (N−1) bits of DAC output can be acquired from the optical waveguides 16-1 to 16-(N−1). The DAC output having a low number of bits can be used for a monitor port for operation calibration. Further, by combining the N-bit optical DAC and an optical switch to select one of the outputs of the optical waveguides 16-1 to 16-(N−1) and 17, a resolution switch function can be implemented.

Embodiment 3

Figure 5:
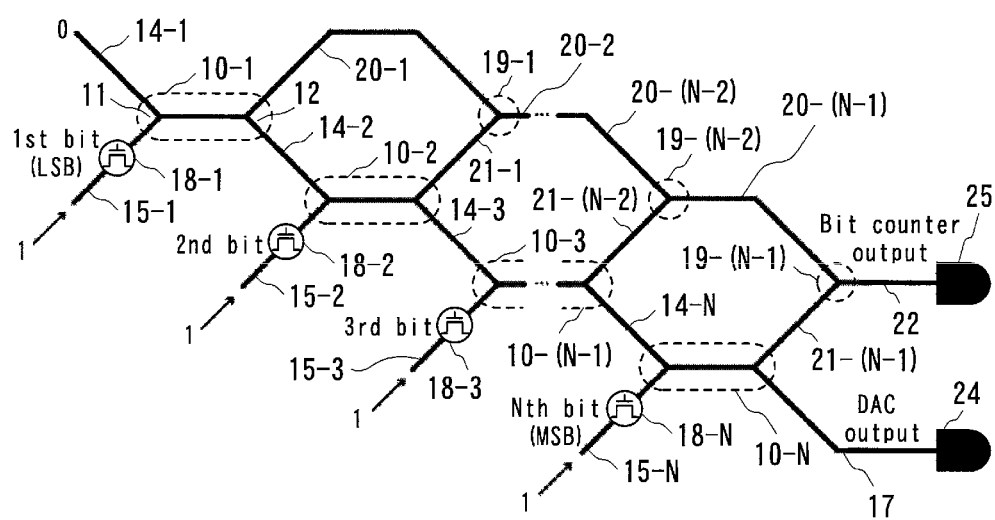
FIG. 5 is a block diagram depicting a configuration of an N-bit optical DAC according to Embodiment 3 of the present invention.

Embodiment 3 of the present invention will be described next. FIG. 5 is a block diagram depicting a configuration of an N-bit optical DAC, which is an optical computing unit according to Embodiment 3 of the present invention. The N-bit optical DAC of Embodiment 3 is constituted of: cascade-connected N number of Y coupling/Y branching elements 10-1 to 10-N having two inputs and two outputs; an optical waveguide 14-1 connected to one optical input port of the Y coupling/Y branching element 10-1 in the first stage; an optical waveguide 14-K (K is an integer in a 2 to N range) that connects one optical output port of the Y coupling/Y branching element 10-(K−1) in the (K−1)th stage and one optical input port of the Y coupling/Y branching element 10-K in the K-th stage; optical waveguides 15-1 to 15-N that are connected to the other optical input ports of the Y coupling/Y branching elements 10-1 to 10-N respectively; an optical waveguide 17 that is connected to one optical output port of the Y coupling/Y branching elements 10-1 to 10-N in the final stage; optical intensity modulators 18-1 to 18-N disposed in the optical waveguides 15-1 to 15-N; cascade-connected (N−1) number of Y coupling elements 19-1 to 19-(N−1) having two inputs and one output; an optical waveguide 20-1 which connects the other optical output port of the Y coupling/Y branching element 10-1 and one optical input port of the Y coupling element 19-1; an optical waveguide 20-*k* (k is an integer in a 2 to (N−1) range) that connects the optical output port of the Y coupling element 19-(*k*−1) in the (k−1)th stage and one optical input port of the Y coupling element 19-*k* in the k-th stage; an optical waveguide 21-*j* (j is an integer in a 1 to (N−1) range) that connects the other optical output port of the Y coupling/Y branching element 10-(*j*+1) in the (j+1)th stage and the other optical input port of the Y coupling element 19-*j* in the j-th stage; and an optical waveguide 22 that is connected to the optical output port of the Y coupling element 19-(N−1) in the final stage.

The N-bit optical DAC of Embodiment 3 largely has the same configuration as Embodiment 2, and the method of inputting the continuous light is the same as Embodiment 2. A difference from Embodiment 2 is that a total number of Y coupling/Y branching elements is N, which is one more than Embodiment 2, using the Y coupling/Y branching element 10-N instead of the Y coupling element 13. Furthermore, the cascade-connected (N−1) number of Y coupling elements 19-1 to 19-(N−1) are disposed, and the output of the Y coupling element 19-(N−1) in the final stage is the output of the bit counter (bit counter output). From this output of the bit counter, the light having an amplitude value, which is in proportion to a number of "1s" of the input digital signal, is output.

In other words, according to the circuit of Embodiment 3, the N-bit DAC computation and the N-bit counter computation can be executed simultaneously.

In Embodiment 3, it is preferable to adjust such that the phase of the input light from the optical waveguide 20-(K−1) to the Y coupling element 19-(K−1) and the phase of the input light from the optical waveguide 21-(K−1) to the Y coupling element 19-(K−1) become a same phase. To implement this adjustment, it is preferable to dispose a phase shifter in at least one of the optical waveguides 20-(K−1) and 21-(K−1).

Figure 6:
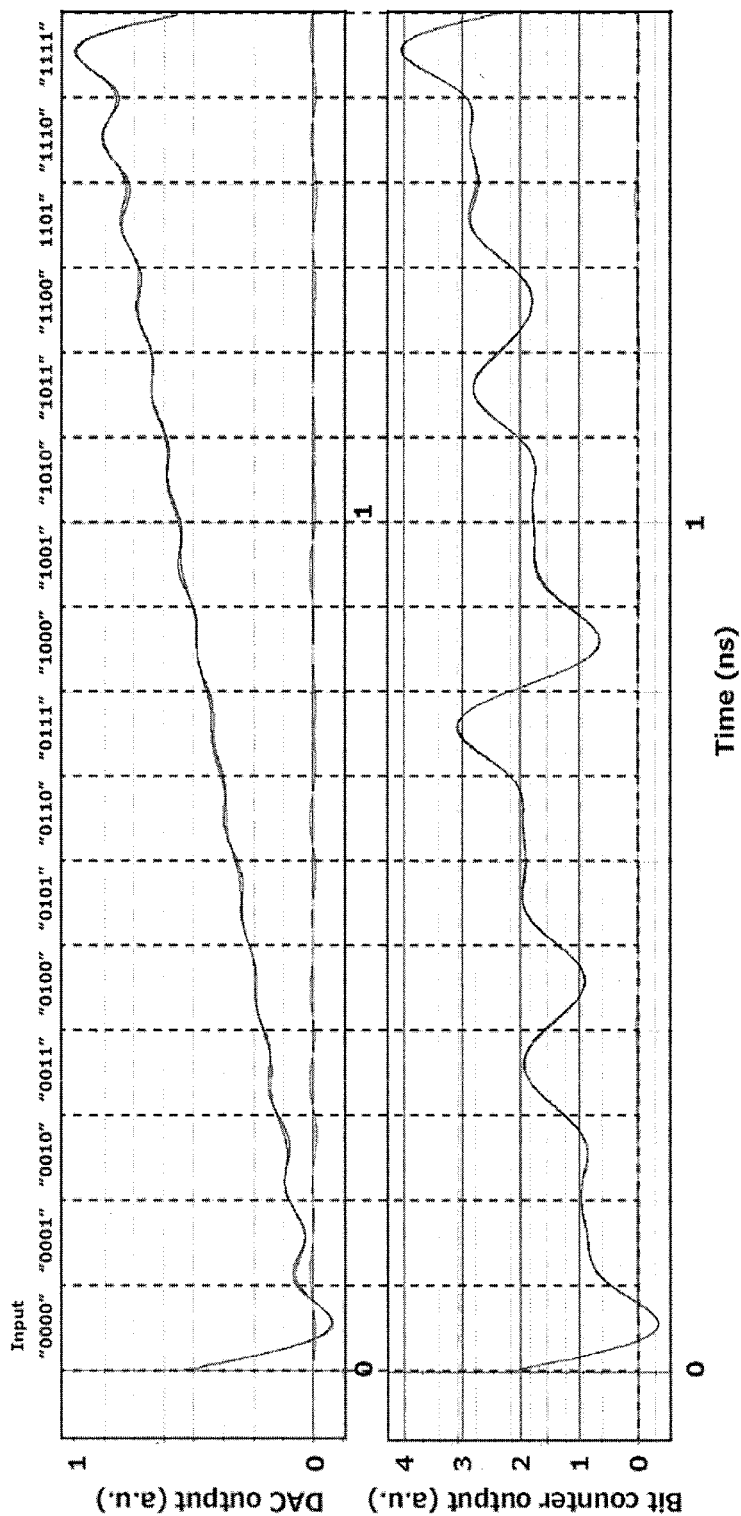
FIG. 6 is a graph depicting an input/output characteristic of the N-bit optical DAC according to Embodiment 3 of the present invention.

FIG. 6 indicates a result of simulating the input/output characteristic (N=4) of the configuration in FIG. 5 using OptiSystem, which is an optical communications system simulator made by Optiwave Systems Inc. Here a bit rate of the signal generation is 10 Gbps, and a waveform after processing the amplitude values of the optical output of the N-bit optical DAC (DAC output) using a low-pass filter so as to cut the high frequency noise, and a waveform after processing the amplitude values of the optical output of the N-bit counter (bit counter output) using a low-pass filter so as to cut the high frequency noise, are indicated. The abscissa in FIG. 6 indicates the time (ns).

As FIG. 6 indicates, when all combinations of the electric digital signals ("0000" to "1111") are sequentially input, the N-bit optical DAC and the N-bit counter are operating normally.

Embodiment 4

In Embodiment 1, the electric signals are acquired by performing the photoelectric conversion on the optical output of the optical waveguide 4 using the photodetector 6. In Embodiment 2, the electric signals are acquired by performing photoelectric conversion on the optical outputs of the optical waveguides 16-1 to 16-(N−1) and 17, using the photodetectors 23-1 to 23-N respectively. In Embodiment 3, the electric signals are acquired by performing photoelectric conversion on the output of the optical waveguide 17 using the photodetector 24, and performing photoelectric conversion on the output of the optical waveguide 22 using the photodetector 25.

In Embodiments 1 to 3, however, the physical quantity to be detected in the optical output is an optical amplitude value. In the case where an optical intensity value is acquired by performing photoelectric conversion on the optical output using the photodetectors 6, 23-1 to 23-N, 24 and 25, the amplitude is squared, and the output becomes a quadratic function. This means that the square root processing of the intensity values must be performed on the electric circuit side to linearize the function. To prevent an accumulation of the computation delay due to the square root processing, the following two methods can be used.

Figure 7:
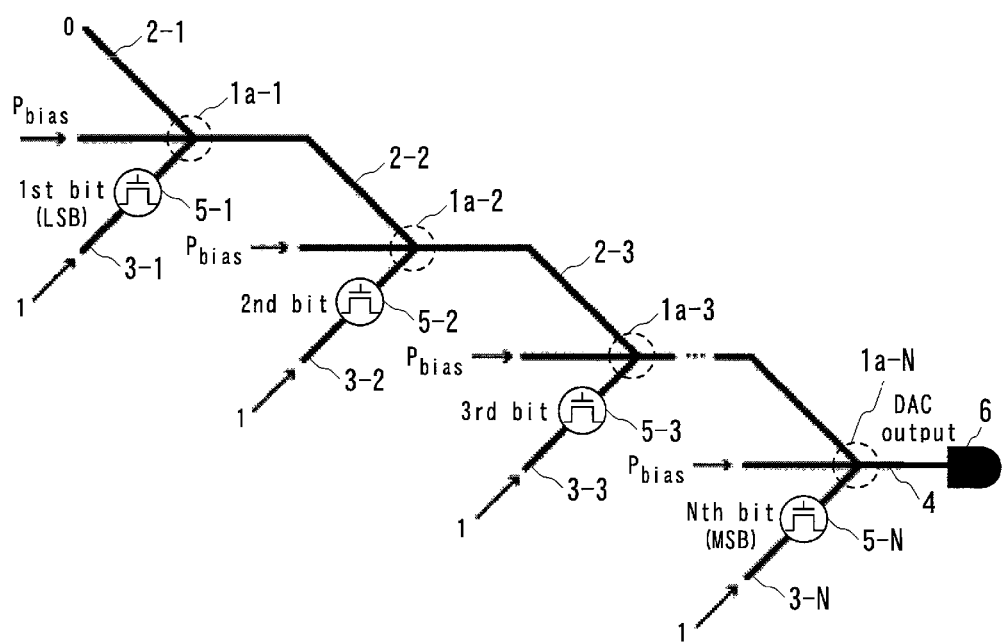
FIG. 7 is a block diagram depicting a configuration of an N-bit optical DAC according to Embodiment 4 of the present invention.

(I) Control by Bias Port
(II) Detecting Optical Amplitude Value Using Coherent Detection Embodiment 4 uses the Method (I). FIG. 7 is a block diagram depicting an N-bit optical DAC according to Embodiment 4, and a composing element the same as FIG. 1 is denoted with the same reference sign. The N-bit optical DAC of Embodiment 4 is constituted of: cascade-connected N number of bias port-included Y coupling elements 1a-1 to 1a-N having three inputs and one output; an optical waveguide 2-1 that is connected to one optical input port of the bias port-included Y coupling element 1a-1 in the first stage; an optical waveguide 2-M (M is an integer in a 2 to N range) that connects an optical output port of a bias port-included Y coupling element 1a-(M−1) in the (M−1)th stage and one optical input port of a bias port-included Y coupling element 1a-M in the M-th stage; optical waveguides 3-1 to 3-N which are connected to the other optical input ports of the bias port-included Y coupling elements 1a-1 to 1a-N; an optical waveguide 4 that is connected to the optical output port of the bias port-included Y coupling element 1a-N in the final stage; and optical intensity modulators 5-1 to 5-N disposed in the optical waveguides 3-1 to 3-N respectively.

Figure 8:
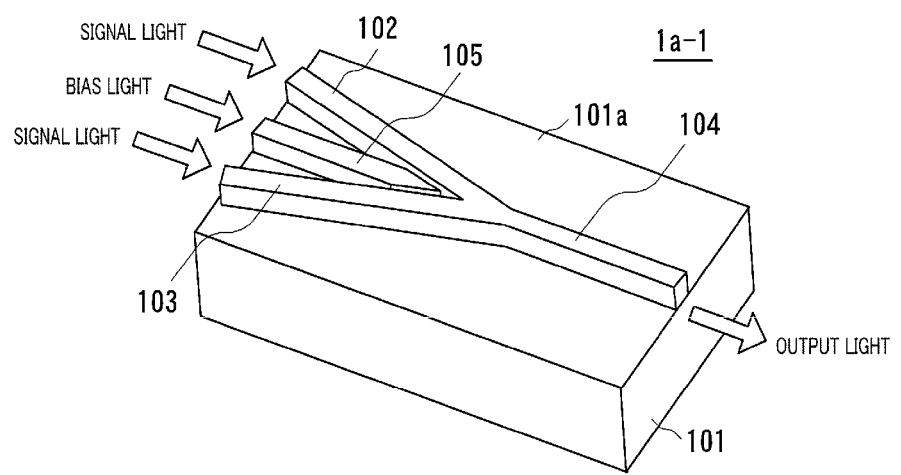
FIG. 8 is a perspective view depicting a configuration of a bias port-included Y coupling element in the N-bit optical DAC according to Embodiment 4 of the present invention.
Figure 9:
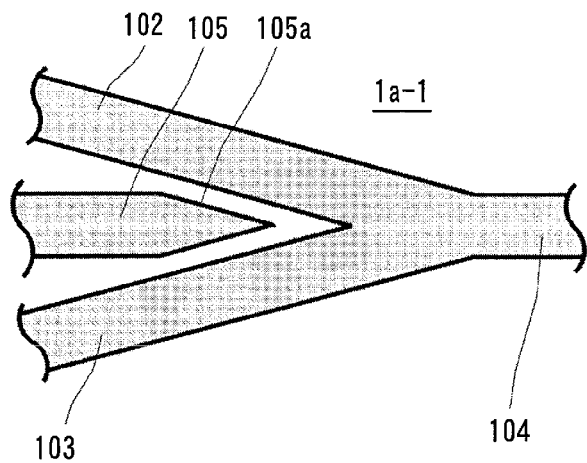
FIG. 9 is a plan view depicting the configuration of the bias port-included Y coupling element in the N-bit optical DAC according to Embodiment 4 of the present invention.

A difference from Embodiment 1 is that the bias port-included Y coupling elements 1a-1 to 1a-N are used instead of the Y coupling elements 1-1 to 1-N. FIG. 8 is a perspective view depicting the configuration of the bias port-included Y coupling element 1a-1, and FIG. 9 is a plan view depicting the configuration of the bias port-included Y coupling element 1a-1.

As illustrated in FIG. 8, the bias port-included Y coupling element 1a-1 includes: a substrate 101 formed of a first dielectric material; and an optical waveguide 102, an optical waveguide 103, an optical waveguide 104 and an optical waveguide 105 (bias port) which are formed on one surface 101a of the substrate 101, and are formed of a second dielectric material having a higher refractive index than the first dielectric material.

An example of the first dielectric material constituting the substrate 101 is silica ($SiO_2$) quartz.

An example of the second dielectric material constituting the optical waveguides 102 to 105 is silicon (Si). The refractive index of silica is 1.4 in the communication wavelength band (e.g. 1.5 μm wavelength), while the refractive index of silicon (Si) is 3.5. Therefore, if the optical waveguides 102 to 105 are constituted of silicon, the substrate and air function as a clad that confines light inside the optical waveguides 102 to 105.

Further, by forming the optical waveguides 102 to 105 on one surface 101a of the substrate 101, the bias port-included Y coupling element 1a-1 is configured on the planar optical waveguide.

As illustrated in FIG. 8 and FIG. 9, in the bias port-included Y coupling element 1a-1 according to Embodiment 4, the optical waveguide 102, the optical waveguide 103 and the optical waveguide 104 are connected together at one end thereof, so as to configure the Y coupling element. The optical waveguide 102 and the optical waveguide 103 are optical waveguides for inputting the signal light respectively, and function as a set of optical input ports. The optical waveguide 104 is an optical waveguide for outputting the signal light, and functions as an optical output port.

In Embodiment 4, the optical waveguide 102 and the optical waveguide 103, which function as optical input ports, are disposed symmetrically with respect to the extended line of the optical waveguide 104, which functions as an optical output port.

The optical waveguide 105, on the other hand, is an optical waveguide for inputting the bias light, and functions as a bias port.

The optical waveguide 105, which functions as the bias port, is disposed between the optical waveguide 102 and the optical waveguide 103. In concrete terms, the optical waveguide 105 is disposed on the extended line of the optical waveguide 104.

One end, that is closer to the Y coupling element of the optical waveguide 105, is tapered in the plan view. This tapered end of the optical waveguide 105 is referred to as the "tapered portion 105a". This tapered portion 105a is disposed close to the optical waveguide 102 and the optical waveguide 103 of the Y coupling element with spacing. As a result, the optical waveguide 102, the optical waveguide 103 and the optical waveguide 105 optically couple with each other.

In this bias port-included Y coupling element 1a-1, the input signal lights propagate through the optical waveguides 102 and 103, which function as the optical input ports, interfere with the bias light propagating through the optical waveguide 105, and the output light is output from the optical waveguide 104, which functions as the optical output port.

The bias port-included Y coupling element 1a-1 can be manufactured in the following steps. That is, a silicon-on-insulator (SOI) substrate having a low loss monocrystal silicon layer is prepared, and after a photosensitive material coated on the surface of the monocrystal silicon layer is patterned into a predetermined pattern, as illustrated in FIG. 9, for example, the silicon layer is etched. Thereby the element illustrated in FIG. 8 can be acquired.

Figure 10:
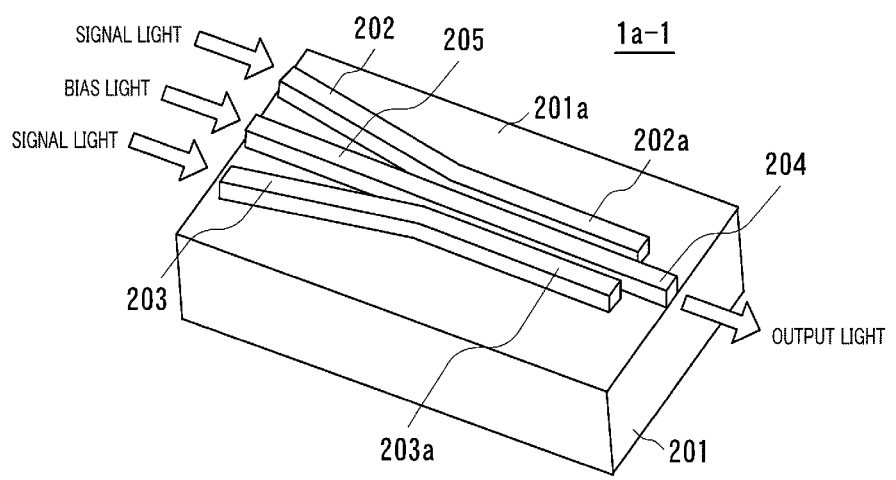
FIG. 10 is a perspective view depicting another configuration of the bias port-included Y coupling element in the N-bit optical DAC according to Embodiment 4 of the present invention.
Figure 11:
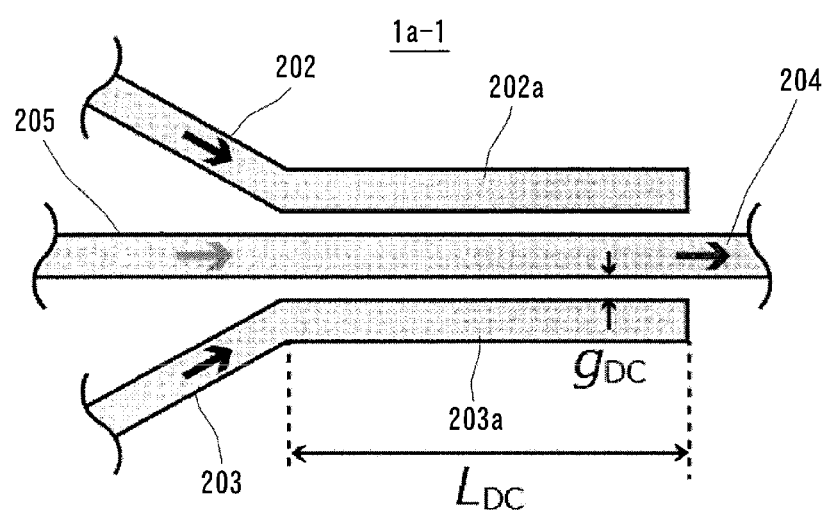
FIG. 11 is a perspective view depicting another configuration of the bias port-included Y coupling element in the N-bit optical DAC according to Embodiment 4 of the present invention.

FIG. 10 is a perspective view depicting another configuration of the bias port-included Y coupling element 1a-1, and FIG. 11 is a plan view depicting another configuration of the bias port-included Y coupling element 1a-1.

As illustrated in FIG. 10, this bias port-included Y coupling element 1a-1 includes: a substrate 201 formed of a first dielectric material, such as silica ($SiO_2$); and an optical waveguide 202, an optical waveguide 203, an optical waveguide 204 and an optical waveguide 205 which are formed of a second dielectric material having a higher refractive index than the first dielectric material. Here the optical waveguide 202 and the optical waveguide 203 function as optical input ports, the optical waveguide 204 functions as an optical output port, and the optical waveguide 205 functions as a bias port.

As illustrated in FIG. 10 and FIG. 11, in the bias port-included Y coupling element 1a-1, the optical waveguide 205, which functions as a bias port, is disposed between the optical waveguide 202 and the optical waveguide 203, which function as optical input ports. The optical waveguide 202 and the optical waveguide 203 are disposed symmetrically with respect to the optical waveguide 205 in the plan view.

The optical waveguide 205, and the optical waveguide 204 which functions as an optical output port, are connected with each other at one end thereof.

The optical waveguide 202 and the optical waveguide 203, which function as optical input ports, have coupling portions 202a and 203a, to couple with the optical waveguide 205, which functions as the bias port respectively. That is, the coupling portions 202a and 203a are tip portions of the optical waveguide 202 and the optical waveguide 203 for the length $L_{DC}$, which are disposed in parallel with spacing $g_{DC}$ with the optical waveguide 204 respectively. Since the optical waveguide 202 and the optical waveguide 203 have the coupling portions 202a and 203a respectively, the optical waveguide 202, the optical waveguide 203 and the optical waveguide 205, which are disposed apart from each other yet are close enough to make coupling possible, constitute a directional coupler. The length $L_{DC}$ of the coupling portions 202a and 203a is preferably about 90% of the 3 dB coupling length.

The configuration of the bias port-included Y coupling element 1a-1 has been described, but the configuration of the other bias port-included Y coupling elements 1a-2 to 1a-N are also the same as the configuration of the bias port-included Y coupling element 1a-1.

In Embodiment 4, the bias light having the fixed intensity $P_{bias}$ is input from a continuous laser light source (not illustrated) to the bias ports of all the bias port-included Y coupling elements 1a-1 to 1a-N. The phase of the signal light which is input to the two optical input ports of each bias port-included Y coupling element 1a-1 to 1a-N and the phase of the bias light which is input to the bias port are assumed to be a same phase.

Figure 12:
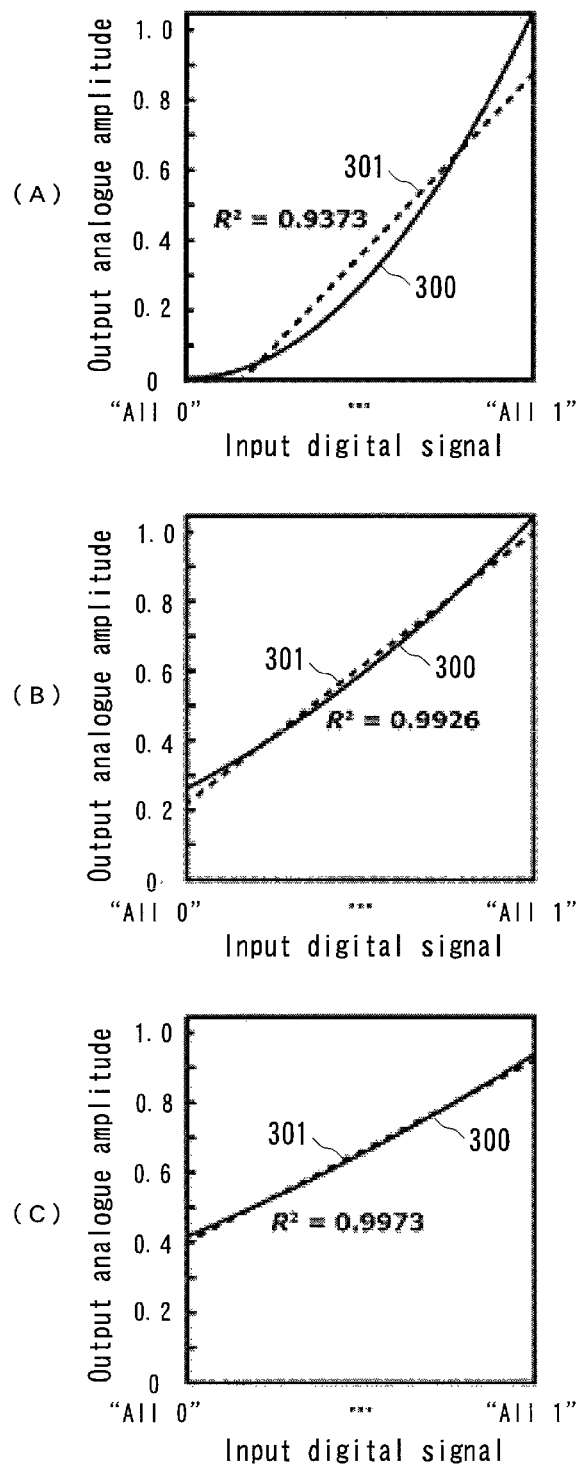
FIG. 12(A) to FIG. 12(C) are graphs depicting the input/output characteristic of the N-bit optical DAC according to Embodiment 4 of the present invention.

Similar to Embodiment 1, FIG. 12(A) to FIG. 12(C) indicate the input/output characteristic under different bias light intensity conditions, in the case where the transmittance T of the lights input from the two optical input ports of the bias port-included Y coupling element 1a-1 (i=1 to N) to the optical output port of the Y coupling element 1a-1 are both 0.25. In FIG. 12(A) to FIG. 12(C), the abscissa indicates an electric digital signal, and the ordinate indicates the normalized value of the optical output intensity of the N-bit optical DAC.

FIG. 12(A) indicates a case where the product $T_{bias}P_{bias}$ of the transmittance $T_{bias}$ of the bias light and the intensity $P_{bias}$ of the bias light is 0, FIG. 12(B) indicates a case where $T_{bias}P_{bias}$ is 0.0625, and FIG. 12(C) indicates a case where $T_{bias}P_{bias}$ is 0.25. The characteristic indicated by the broken line 301 in FIG. 12(A) to FIG. 12(C) is a characteristic when the actual input/output characteristic indicated by the solid line 300 is linearly approximated. $R^2$ is a mean square error between the actual input/output characteristic and linear approximation thereof. In the example in FIG. 12(A) to FIG. 12(C), the mean square errors $R^2$ are 0.9373, 0.9926 and 0.9973 respectively. In this way, as $T_{bias}P_{bias}$ increases, the input/output relationship of the N-bit optical DAC becomes closer from a quadratic function to a linear function.

Therefore if the intensity $P_{bias}$ of the bias light is appropriately adjusted, the relationship between the input digital signal and the output of the photodetector 6 can be linear, and the electric circuit side need not perform square root processing on the output of the photodetector 6.

However as illustrated in FIG. 12(A) to FIG. 12(C), as $T_{bias}P_{bias}$ increases, the intercept (optical output intensity when all input bits are "0") gradually increases from zero as well. Therefore, instead of performing square root processing after the photoelectric conversion, subtraction, to remove the intercept, is required at the electric circuit side. This processing, however, can be implemented relatively easily and quickly using a threshold processor.

Embodiment 4 may be applied to Embodiments 2 and 3. To apply Embodiment 4 to Embodiments 2 and 3, the Y coupling element 11 of each Y coupling/Y branching element 10-1 to 10-N and the Y coupling element 13 are replaced with a bias port-included Y coupling element respectively.

Embodiment 5

Figure 13:
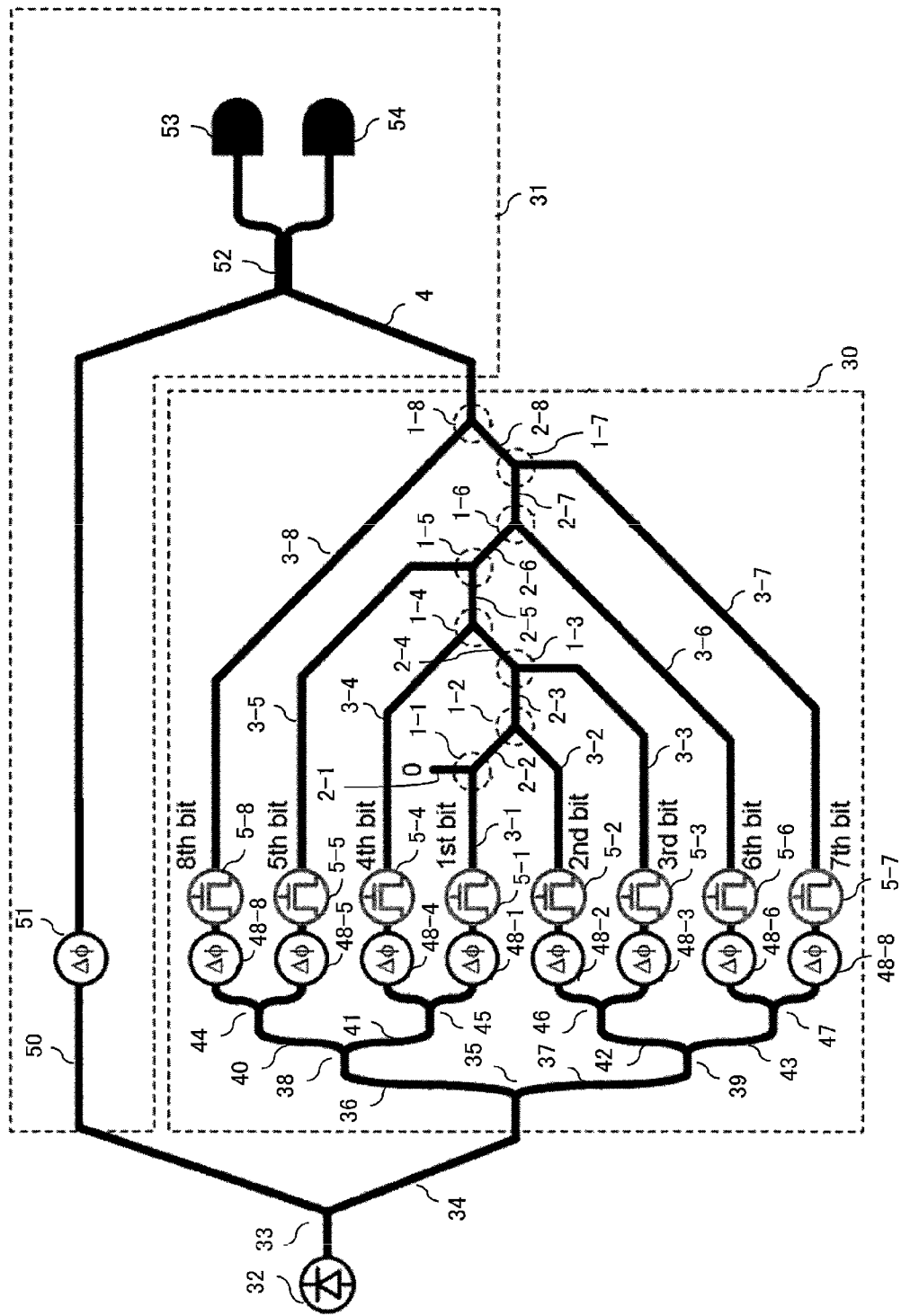
FIG. 13 is a block diagram depicting a configuration of an N-bit optical DAC according to Embodiment 5 of the present invention.

Embodiment 5 of the present invention will be described. Embodiment 5 uses the Method (II) mentioned above. FIG. 13 is a block diagram depicting an N-bit optical DAC, which is an optical computing unit according to Embodiment 5, and a composing element the same as FIG. 1 is denoted with the same reference sign. In the example in FIG. 13, it is assumed that N=8, and the optical DAC coupling unit 30 corresponding to FIG. 1 and the coherent detection unit 31 are integrated.

The continuous laser light emitted from a continuous laser light source 32 is divided equally into 2 by a Y branching element 33. One side of the continuous light branched by the Y branching element 33 is input to a Y branching element 35 via an optical waveguide 34. The Y branching element 35 divides the continuous light input from the optical waveguide 34 equally into 2. One side of the continuous light branched by the Y branching element 35 is input to a Y branching element 38 via an optical waveguide 36, and the other side of the branched continuous light is input to a Y branching element 39 via an optical waveguide 37.

The Y branching element 38 divides the continuous light input from the optical waveguide 36 equally into 2, and the Y branching element 39 divides the continuous light input from the optical waveguide 37 equally into 2. One side of the continuous light branched by the Y branching element 38 is input to a Y branching element 44 via an optical waveguide 40, and the other side of the branched continuous light is input to a Y branching element 45 via an optical waveguide 41. One side of the continuous light branched by the Y branching element 39 is input to a Y branching element 46 via an optical waveguide 42, and the other side of the branched continuous light is input to a Y branching element 47 via an optical waveguide 43.

The Y branching element 44 divides the continuous light input from the optical waveguide 40 equally into 2, and the Y branching element 45 divides the continuous light input from the optical waveguide 41 equally into 2. The Y branching element 46 divides the continuous light input from the optical waveguide 42 equally into 2, and the Y branching element 47 divides the continuous light input from the optical waveguide 43 equally into 2.

One side of the continuous light branched by the Y branching element 44 is input to an optical waveguide 3-8, and the other side of the branched continuous light is input to an optical waveguide 3-5. One side of the continuous light branched by the Y branching element 45 is input to an optical waveguide 3-4, and the other side of the branched continuous light is input to an optical waveguide 3-1. One side of the continuous light branched by the Y branching element 46 is input to an optical waveguide 3-2, and the other side of the branched continuous light is input to an optical waveguide 3-3. One side of the continuous light branched by the Y branching element 47 is input to an optical waveguide 3-6, and the other side of the branched continuous light is input to an optical waveguide 3-7. In this way, input of the continuous light to the optical waveguides 3-1 to 3-8, described in Embodiment 1, can be implemented.

48-1 to 48-8 in FIG. 13 indicates the phase shifters described in Embodiment 1.

A coherent detection unit 31 is constituted of: an optical waveguide 50 connected to the other optical output port of the Y branching element 33; a phase shifter 51 disposed on the optical waveguide 50; a 3 dB coupler 52 (MMI coupler) which couples the propagated lights through an optical waveguide 4 and the optical waveguide 50 at equal ratios, divides the coupled light equally into 2, and outputs the divided lights; a photodetector 53 that converts one output light from the 3 dB coupler 52 into an electric signal; and a photodetector 54 that converts the other output light from the 3 dB coupler 52 into an electric signal.

It is preferable that before operating the configuration in FIG. 13 as an 8-bit optical DAC, the phase shifter 51 is adjusted in advance, so that the phase difference between the output light, which propagates through the optical waveguide 4 from the optical DAC computing unit 30 and is input to the 3 dB coupler 52, and the reference light which propagates through the optical waveguide 50 and is input to the 3 dB coupler 52, becomes $\pi/2$.

The two outputs from the 3 dB coupler 52 are received by the two different photodetectors 53 and 54, and the difference between the two electric signals output from the photodetectors 53 and 54 is determined by a subtracter (not illustrated). In this way, the optical amplitude value can be detected using the configuration of a so called "balanced detector".

A coherent optical receiver normally synchronizes the phases of the locally emitted lights that are different from the light source of the signal light so as to generate a reference light. This phase synchronization requires high cost. In the case of the optical computing unit according to Embodiment 5, on the other hand, the transmitter and receiver disposed close to each other are integrated, hence only the coherent detection unit 31 is required for the reference light, whereby the homodyne detection can be performed by the same continuous laser light source 32 of the optical DAC computing unit 30.

In Embodiment 5, a case of applying the homodyne detection to Embodiment 1 was described, but the homodyne detection may be applied to Embodiments 2 to 4.

To apply the homodyne detection to Embodiment 2, the coherent detection unit is disposed instead of the photodetectors 23-1 to 23-N respectively, so that the lights from the same continuous laser light sources of the optical waveguides 15-1 to 15-N are input to one optical input port of the 3 dB coupler, and the lights from the optical waveguides 16-1 to 16-(N−1) and 17 are input to the other optical input port of the 3 dB coupler.

To apply the homodyne detection to Embodiment 3, the coherent detection unit is disposed instead of the photodetectors 24 and 25 respectively, so that the lights from the same continuous light sources of the optical waveguides 15-1 to 15-N are input to one optical input port of the 3 dB coupler, and the lights from the optical waveguides 17 and 22 are input to the other optical input port of the 3 dB coupler.

To apply the homodyne detection to Embodiment 4, the coherent detection unit is disposed instead of the photodetector 6, so that the lights from the same continuous light sources of the optical waveguides 3-1 to 3-N are input to one optical input port of the 3 dB coupler, and the light from the optical waveguide 4 is input to the other optical input port of the 3 dB coupler.

Embodiment 6

Embodiment 6 of the present invention will be described next. In Embodiments 1, 4 and 5, the transmittance T of the light, which was input from each of the two optical input ports (not including the bias port of Embodiment 4) of the Y coupling elements 1-1 and 1a-1 (i=1 to N) to the optical output ports of the Y coupling elements 1-1 and 1a-1, is 0.25 respectively. In Embodiments 2 and 3, the transmittance $T_{11}$ of the light, which was input to the two optical input ports of the Y coupling element 11 constituting the Y coupling/Y branching element 10-$j$ (j is an integer in a 1 to (N−1) range) to the optical output port of the Y coupling element 11, is 0.5 respectively, and the transmittance $T_{12}$ of the light, which was input to the optical input ports of the Y branching element 12 constituting the Y coupling/Y branching element 10-$j$ to the two optical ports of the Y branching element 12, is 0.5 respectively. Thereby according to Embodiments 1 to 5, the light intensity difference is provided to each of the N number of lights, so that the (N−1) number of lights corresponding to each bit of the N-bit electric digital signal, not including LSB, has a light intensity that is 4 times (6 dB) that of the light intensity of the light corresponding to the adjacent lower bit respectively.

In this way, according to Embodiments 1 to 5, the light intensity difference is provided to the N number of lights corresponding to the N-bit electric digital signal at the output side of the modulator, but in Embodiment 6, the light intensity difference is provided to the N number of lights not only at the output side, but also at the input side of the modulator.

Figure 14:
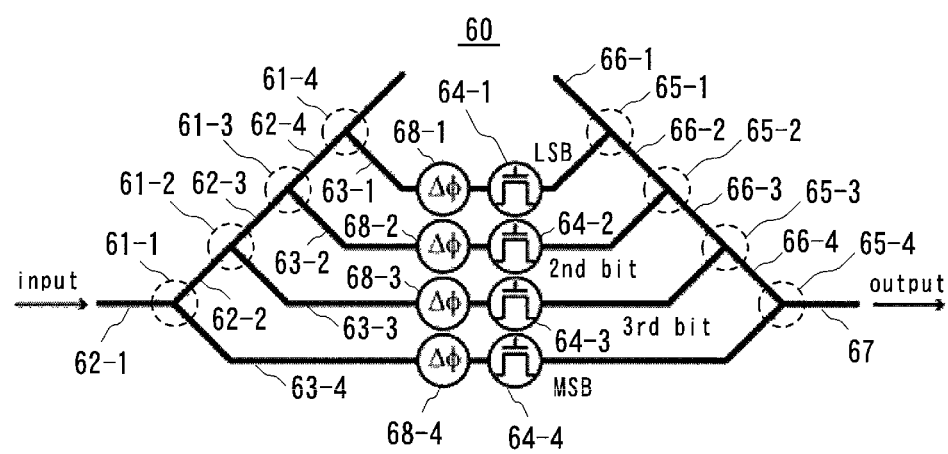
FIG. 14 is a block diagram depicting a configuration of an N-bit optical DAC according to Embodiment 6 of the present invention.

FIG. 14 is a block diagram depicting a configuration of an N-bit optical DAC, which is an optical computing unit according to Embodiment 6.

The N-bit optical DAC 60 of Embodiment 6 is constituted of: a cascade-connected N number of Y branching elements 61-1 to 61-N (N=4 in Embodiment 6) having one input and two outputs; an optical waveguide 62-1 that is connected to an optical input port of the Y branching element 61-1 in the first stage; an optical waveguide 62-M (M is an integer in a 2 to N range) that inputs a light output from the Y branching element 61-(M−1) to the Y branching element 61-M by connecting one side of the optical output port of the Y branching element 61-(M−1) in the (M−1)th stage and the optical input port of the Y branching element 61-M in the M-th stage; optical waveguides 63-N to 63-1 that are connected to the other optical output ports of the Y branching elements 61-1 to 61-N respectively; optical intensity modulators 64-1 to 64-N (optical modulators) disposed in the optical waveguides 63-1 to 63-N; cascade-connected N number of Y coupling elements 65-1 to 65-N having two inputs and one output, so that one optical input port of each N number of Y coupling elements 65-1 to 65-N is connected to the optical waveguides 63-1 to 63-N and the other optical input port thereof is connected to the optical output of the Y coupling element in the previous stage; an optical waveguide 66-1 that is connected to the other optical input port of the Y coupling element 65-1 in the first stage; an optical waveguide 66-M that connects the optical output port of the Y coupling element 65-1(M−1) in the (M−1)th stage and the other optical input port of the Y coupling element 65-M in the M-th stage and inputs the light output from the Y coupling element 65-(M−1) to the Y coupling element 65-M; an optical waveguide 67 that is connected to the optical output port of the Y coupling element 65-N in the final stage; and phase shifters 68-1 to 68-N that adjusts the phases of the lights coupled by the Y coupling elements 65-1 to 65-N so as to be the same phase. As mentioned above, it is assumed that N=4 in the example in FIG. 14.

Each Y branching element 61-i (i=1 to N) divides the propagation light through the optical waveguide 62-i equally into 2 (branching ratio 1:1). In this case, the transmittance T of the light, which was input to the optical input port of the Y branching element 61-i, to the two optical output ports of the Y branching element 61-i, is 0.5 respectively. In this way, each Y branching element 61-i is cascade-connected so that each Y branching element, not including the Y branching element at the most upstream side which inputs a single continuous light is input, enables the light output from one optical output port, out of the two optical output ports of the Y branching element at the upstream side, to be the input.

Thereby the continuous laser light from a single continuous laser light source (not illustrated) is branched into N number of continuous lights corresponding to each bit of the N-bit electric digital signal, and a light intensity difference can be provided to the N number of continuous lights, so that the light intensity of the (N−1) number of continuous lights corresponding to each bit of the N-bit electric digital signal, not including LSB, is twice (3 dB) that of the continuous light corresponding to the adjacent lower bit respectively.

The light corresponding to the i-th bit counted from MSB of the N-bit electric digital signal is output from the optical output port, to which the Y branching element in the subsequent stage is not connected, out of the two optical output ports of the i-th Y branching element 61-i counted from the most upstream side. The optical input to the optical waveguide 63-i corresponds to the input of the i-th bit counted from LSB.

Just like the optical intensity modulators 5-1 to 5-N, each one of the optical intensity modulators 64-1 to 64-N, which are disposed for each bit of the N-bit electric digital signal, interrupts the continuous light propagating in each optical waveguide 63-1 to 63-N if the corresponding bit input of the electric digital signal is "0", and allows the continuous light to pass if the bit input is "1".

Just like the optical waveguide 2-1, the optical waveguide 66-1 corresponds to zero input. That is, light is not input to the optical waveguide 66-1. The Y coupling element 65-i couples the propagating light in the optical waveguide 66-i and the propagating light in the optical waveguide 63-i at equal ratios (coupling ratio 1:1), and outputs the coupled light. At this time, the transmittance T of the light, which was input from each of the two optical input ports of the Y coupling element 65-i to the optical output port of the Y coupling element 65-i, is 0.5 respectively. In this way, each Y coupling element 65-i is cascade-connected such that the signal light, of which intensity was modulated by the optical intensity modulator 64-i, becomes one optical input, and each Y coupling element, not including the Y coupling element at the most upstream side, enables the light output from the optical output port of the Y coupling element at the upstream side to be the other optical input.

In this way, the N number of signal lights, of which intensity was modulated by the optical intensity modulators 64-1 to 64-N, are coupled into one, and the light intensity difference can be provided to the N number of signal lights, so that the light intensity of the (N−1) number of signal lights corresponding to each bit, not including the LSB of the N-bit electric digital signal, is twice (3 dB) that of the continuous light corresponding to the adjacent lower bit respectively.

The phases of the phase shifters 68-1 to 68-N have been adjusted in advance, so that the optical output intensity of each Y coupling element 65-1 to 65-N becomes the maximum (phases of the lights coupled by each Y coupling element 65-1 to 65-N becomes the same phase) when each optical intensity modulator 64-1 to 64-N is in the passing state.

By the above configuration, the final optical output (output) of the N-bit optical DAC 60 is acquired from the optical waveguide 67.

The computing loss Loss in Embodiment 6 can be defined in the following formula.

[Formula 1]

$$\text{Loss} = -10\log_{10}\left(\frac{P_{out\_max}}{P_{in}}\right) = -20\log_{10}\left(\frac{A_{out\_max}}{P_{in}}\right) \quad (1)$$

In Formula (1), $P_{out\_max}$ is the maximum optical output intensity in the case where all the inputs of the N-bit electric digital signal are "1", $P_{in}$ is the optical input intensity (fixed to $P_{in}=1$ in Embodiment 6), $A_{out\_max}$ is the optical output amplitude, and is the square root of $P_{out\_max}$.

When the intensity of the input light (input) to the N-bit optical DAC 60 is $P_{in}=1$, as mentioned above, the amplitude $A_{out\_max}$ of the optical output (output) of the N-bit optical DAC 60 is given by the following recurrence formula.

[Formula 2]

$$A_1 = \sqrt{\frac{1}{2^{N+1}}}$$

$$A_2 = \sqrt{T} A_1 + \sqrt{\frac{T}{2^{N-1}}}$$

$$\ldots$$

$$A_n = \sqrt{T} A_{n-1} + \sqrt{\frac{T}{2^{N-n+1}}}$$

(2)

Here T is the optical intensity transmittance of the Y coupling elements 65-1 to 65-N (ideally 0.5). When both wide of Formula (2) are divided by $\sqrt{(2^n)}$, the following formula is given.

[Formula 3]

$$\frac{A_n}{\sqrt{2^n}} = \sqrt{\frac{T}{2}} \frac{A_{n-1}}{\sqrt{2^{n-1}}} + \sqrt{\frac{T}{2^{N+1}}} \quad (3)$$

Since $a_n = pa_{n-1} + q$, the following formula is given by solving Formula (3).

[Formula 4]

$$\therefore A_n = \quad (4)$$

$$\sqrt{\frac{T^{n-1}}{2^{N-1}}} \left\{ 1 + \sqrt{\frac{T}{2}} - \left(1 - \sqrt{\frac{T}{2}}\right)^{-1} \right\} + \sqrt{\frac{T}{2^{N-n+1}}} \left(1 - \sqrt{\frac{T}{2}}\right)^{-1}$$

When n=N is substituted for Formula (4), the following formula is given.

[Formula 5]

$$A_N = A_{out\_max} = \sqrt{\frac{T}{2}} \left(1 - \sqrt{\frac{T}{2}}^N\right) \left(1 - \sqrt{\frac{T}{2}}\right)^{-1} \quad (5)$$

Figure 15:
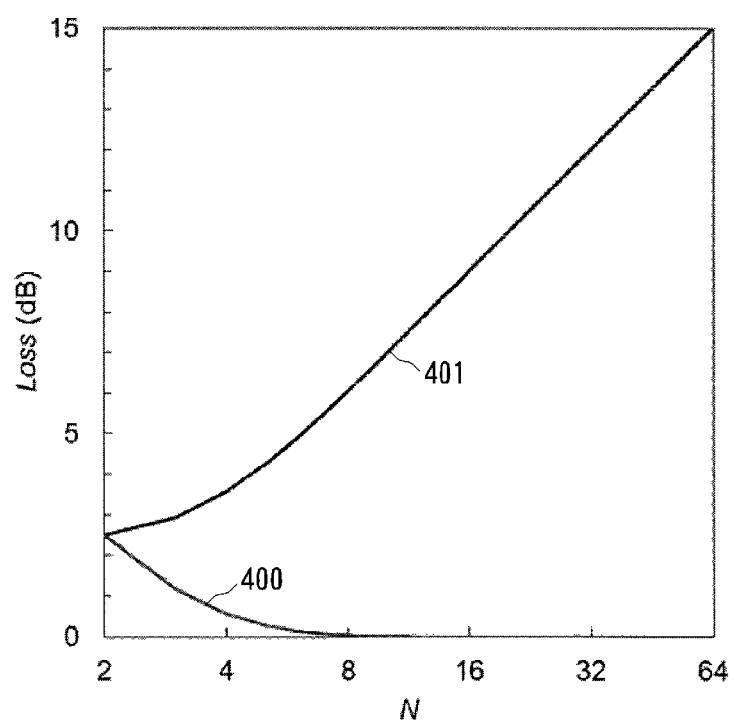
FIG. 15 is a graph depicting a relationship between a number of bits and a computing loss of the optical DAC.

FIG. 15 indicates the relationship of the number of N bits and the computing loss Loss of the N-bit optical DAC, determined by substituting Formula (5) for Formula (1). 400 in FIG. 15 indicates the computing loss Loss of the N-bit optical DAC 60 of Embodiment 6, and 401 indicates the computing loss Loss of the N-bit optical DAC of Embodiments 2 and 3. In the case of Embodiments 2 and 3, the computing loss Loss simply increases with respect to the number of bits N, while in Embodiment 6, the computing loss Loss simply decreases with respect to the number of bits N, and approaches zero loss.

According to Embodiment 6, the computing loss Loss decreases with respect to the number of N bits, hence a configuration suitable for high resolution can be implemented.

Figure 16:
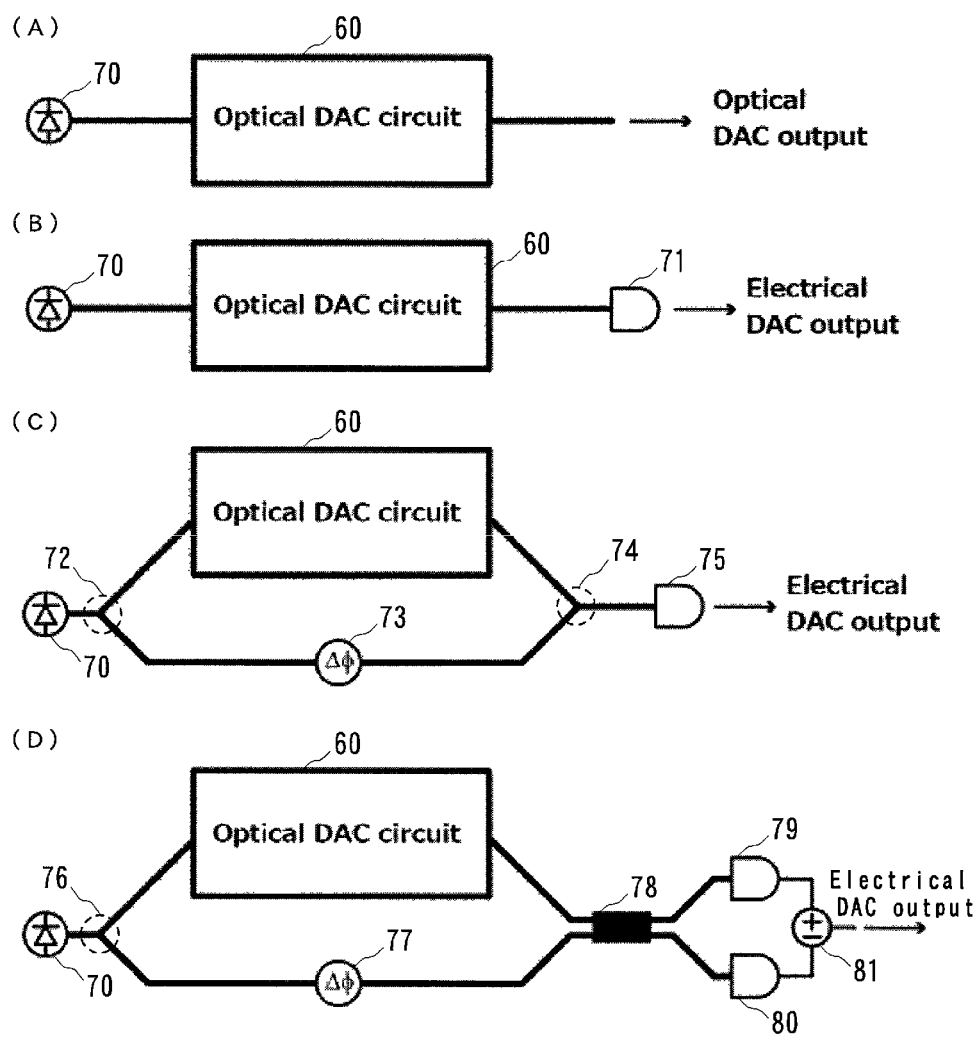
FIG. 16(A) to FIG. 16(D) are diagrams depicting concrete patterns of the configuration to actually operate the optical DAC in FIG. 14.

FIG. 16(A) to FIG. 16(D) indicate concrete patterns of the configuration to actually operate the N-bit optical DAC 60 in FIG. 14. FIG. 16(A) is a case of directly extracting the optical output. In this case, the continuous laser light from the continuous laser light source 70 is input to the N-bit optical DAC 60.

FIG. 16(B) is a case of directly detecting the optical output of the N-bit optical DAC 60 using a single photodetector 71. In this case, an electric signal can be acquired by performing photoelectric conversion on the optical output of the N-bit optical DAC 60 using the photodetector 71.

FIG. 16(C) is a case where the Y coupling element 74 couples continuous lights having a specific amplitude and phase, then the coupled light is directly detected using a single photodetector 75. In the case of FIG. 16(C), the continuous laser light from the continuous laser light source 70 is equally divided into 2 by the Y branching element 72, and one side of the continuous light is input to the N-bit optical DAC 60, and the other side of the continuous light is coupled with the output light of the N-bit optical DAC 60 using the Y coupling element 74. Here the phase of the phase shifter 73 has been adjusted in advance, so that the optical output intensity of the Y coupling element 74 becomes the maximum.

FIG. 16(D) is a case of performing coherent detection. In the case of FIG. 16(D), the continuous laser light from the continuous laser light source 70 is equally divided into 2 by the Y branching element 76, and one side of the continuous light is input to the N-bit optical DAC 60, and the other side of the continuous light is coupled with the output light of the N-bit optical DAC 60 using the 3 dB coupler (MMI coupler) 78. The phase shifter 77 may be adjusted in advance so that the phase difference between the optical light to be input from the N-bit optical DAC 60 to the 3 dB coupler 78 and the other side of the continuous light (reference light) branched by the Y branching element 76 becomes π/2.

The 3 dB coupler 78 couples the output light of the N-bit optical DAC 60 and the reference light of which phase was adjusted by the phase shifter 77 at equal ratios, equally divides the coupled light into 2, and outputs the two lights. The photodetectors 79 and 80 convert the two output lights of the 3 dB coupler 78 into electric signals respectively. The subtracter 81 determines the difference between the two electric signals output from the photodetectors 79 and 80.

In the case of the direct detection in FIG. 16(B) and FIG. 16(C), non-linear output (quadratic function) is acquired, but in the case of coherent detection, linear output is acquired.

The following is the result of simulating the configuration of Embodiment 6 using OptiSystem (made by Optiwave Systems Inc.). Here the result of simulating the configuration depicted in FIG. 17, that is, a configuration combining FIG. 14 and FIG. 16(B), will be described. The simulation conditions are as follows.

(I) Concerning the laser light source 70, it is assumed that the wavelength is 1,550 nm, the light intensity is 1 mW, the line width is 10 MHz, and the initial phase is −90°.

(II) Concerning the optical intensity modulators 64-1 to 64-4, it is assumed that the loss is zero, the bit rate of LSB is 10 Gbps, the extinction ratio is infinite, and the rise time and fall time are 0.05 bit (8 ps). The electric digital signals "0000" to "1111" are sequentially input to the optical intensity modulators 64-1 to 64-4 of each bit.

Figure 17:
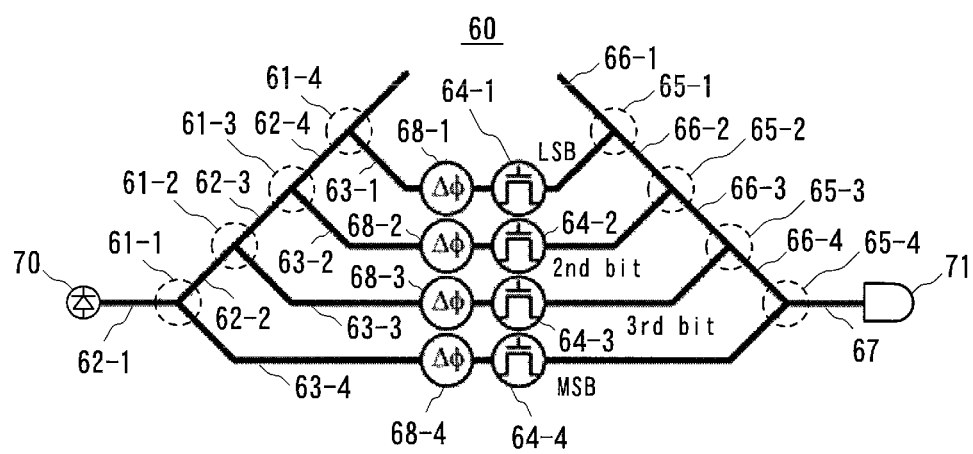
FIG. 17 is a block diagram depicting a configuration of a simulation target optical DAC according to Embodiment 6 of the present invention.

(III) Concerning the optical waveguide and coupler used for the configuration in FIG. 17, it is assumed that the loss is zero, and the propagation delay difference and phase shift among the optical signals of each bit, caused by the optical path length difference, are also zero. Therefore, in the configuration in FIG. 17, the phase shifters 68-1 to 68-N used for adjustment are omitted, since the lights in the same phases are always coupled.

(IV) Concerning the photodetector 71, it is assumed that the conversion efficiency is 1 A/W, the noise is zero, and the band is unlimited.

Figure 18:
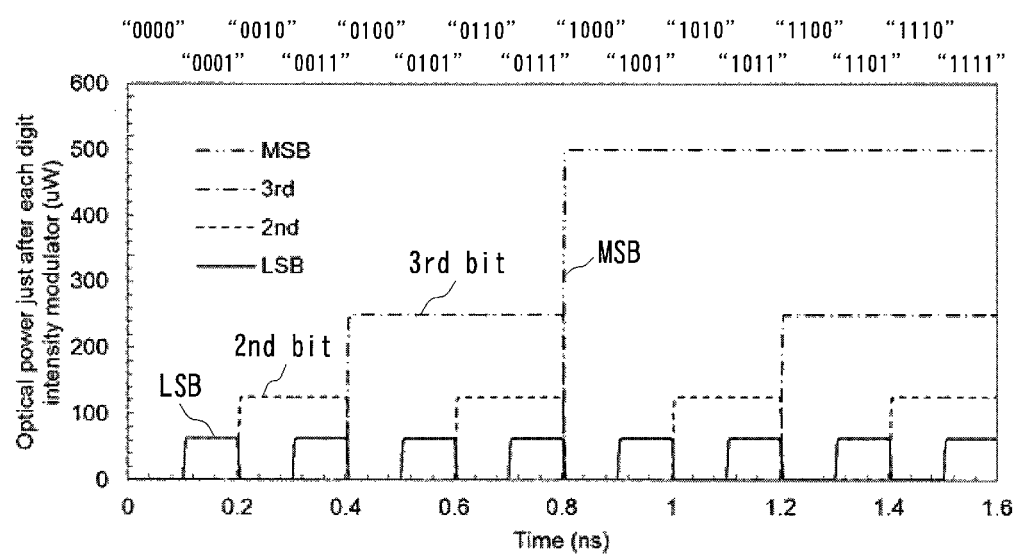
FIG. 18 is a graph depicting a result of simulating the temporal change of the optical signal intensity of each bit in the configuration in FIG. 17.

FIG. 18 is a result of simulating the temporal change of the optical signal intensity of each bit in the configuration of FIG. 17. In FIG. 18, the ordinate indicates the optical signal intensity of each bit, and the abscissa indicate time. According to FIG. 18, there is a twice (3 dB) intensity difference between each bit before coupling is performed by the Y coupling elements 65-1 to 65-4.

Figure 19:
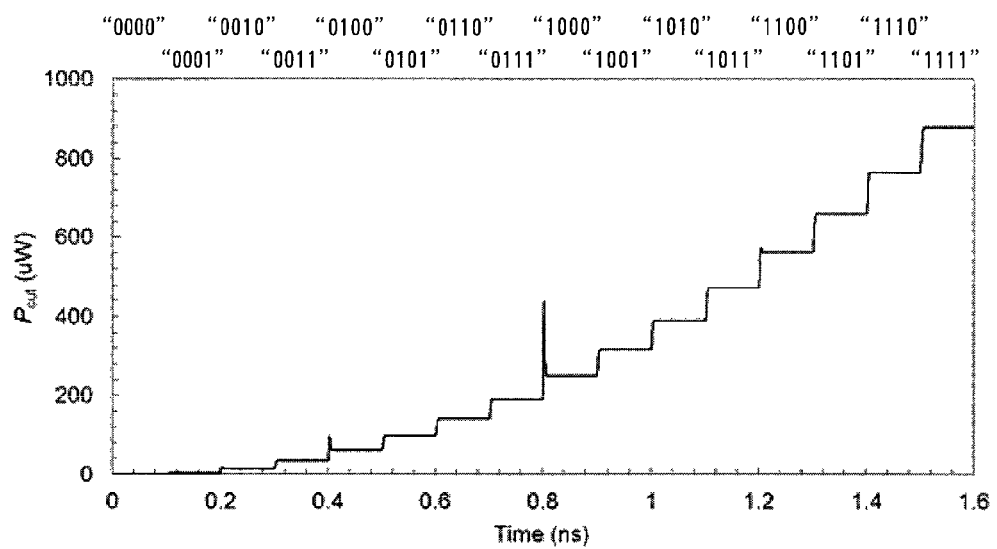
FIG. 19 is a graph depicting a result of simulating the temporal change of the intensity of an optical signal detected by a photodetector in the configuration in FIG. 17.

FIG. 19 is a result of simulating the temporal change of the intensity $P_{out}$ of the optical signal detected by the photodetector 71. According to FIG. 19, $P_{out}$ gradually increases by sequentially inputting the electric digital signals "0000" to "1111" to the optical intensity modulators 64-1 to 64-4. When the electric digital signal is "1111", the $P_{out}$ is up to 879 μW, the computing loss is up to 0.56 dB. This value of the optical signal intensity $P_{out}$ matches with the value acquired by Formula (5).

Further, according to FIG. 19, a spike of the signal is generated between "0111" to "1000". This spike is generated by signals which instantly overlap without intent since the rise time and fall time of the optical modulation signal are finite. This spike, however, can be removed by using an appropriate low-pass filter.

Embodiment 7

Figure 20:
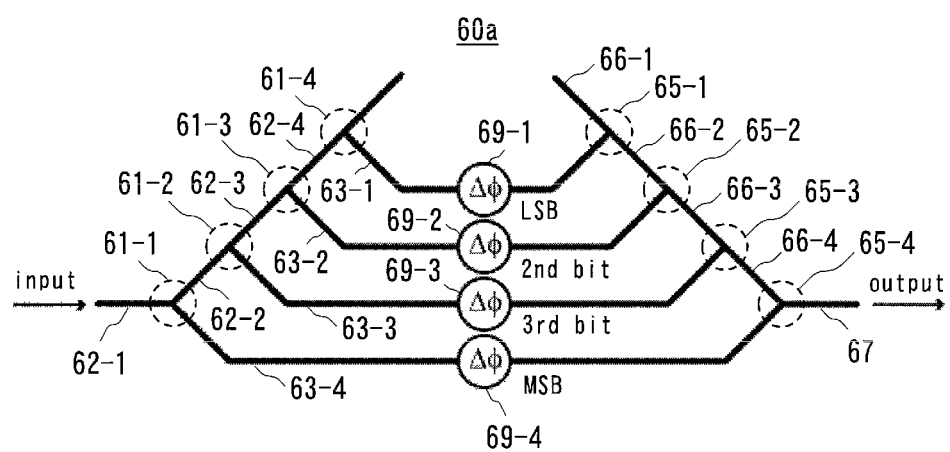
FIG. 20 is a block diagram depicting a configuration of an N-bit optical DAC according to Embodiment 7 of the present invention.

Embodiment 7 of the present invention will be described next. Embodiment 7 is an example when an optical phase modulator is used instead of the optical intensity modulator in Embodiment 6. FIG. 20 is a block diagram depicting a configuration of an N-bit optical DAC, which is an optical computing unit according to Embodiment 7, and a composing element the same as FIG. 14 is denoted with the same reference sign.

The N-bit optical DAC boa of Embodiment 7 is constituted of: Y branching elements 61-1 to 61-N (N=4 in Embodiment 7); optical waveguides 62-1 to 62-N, 63-1 to 63-N, 66-1 to 66-N and 67; Y branching elements 65-1 to 65-N; and optical phase modulators 69-1 to 69-N (optical modulators) disposed on the optical waveguides 63-1 to 63-N. In the example in FIG. 20, it is assumed that N=4, as mentioned above.

Each optical phase modulator 69-1 to 69-N, which is disposed for each bit of the N-bit electric digital signal, outputs the continuous light propagating through each optical waveguide 63-1 to 63-N without changing the phase (in-phase) if the corresponding bit input of the electric digital signal is "0", and outputs the continuous light propagating through each optical waveguide 63-1 to 63-N shifting the phase by $\pi$ (reverse-phase) if the corresponding bit input of the electric digital signal is "1". In this way, in-phase (0) or reverse-phase ($\pi$) is individually assigned to the continuous light propagating through each optical waveguide 63-1 to 63-N, in accordance with the corresponding bit of the N-bit electric digital signal.

Other configurations are the same as Embodiment 6. According to Embodiment 7, the phase shifter in the N-bit optical DAC 60a is unnecessary, whereby a number of composing elements can be decreased.

However, in Embodiment 7, coherent detection is essential to determine the positive/negative of the amplitude of the signal. In other words, a concrete pattern of the configuration that can actually operate the N-bit optical DAC 60a in FIG. 20 is the pattern in FIG. 16(D) alone.

The following is the result of simulating the configuration of Embodiment 7 using OptiSystem (made by Optiwave Systems, Inc.), just like Embodiment 6. Here the result of simulating the configuration depicted in FIG. 21, that is a configuration combining FIG. 20 and FIG. 16(D), will be described. The simulation conditions are the same as (I) to (IV) described above, except that the optical phase modulators 69-1 to 69-4 are used instead of the optical intensity modulators 64-1 to 64-4.

Figure 21:
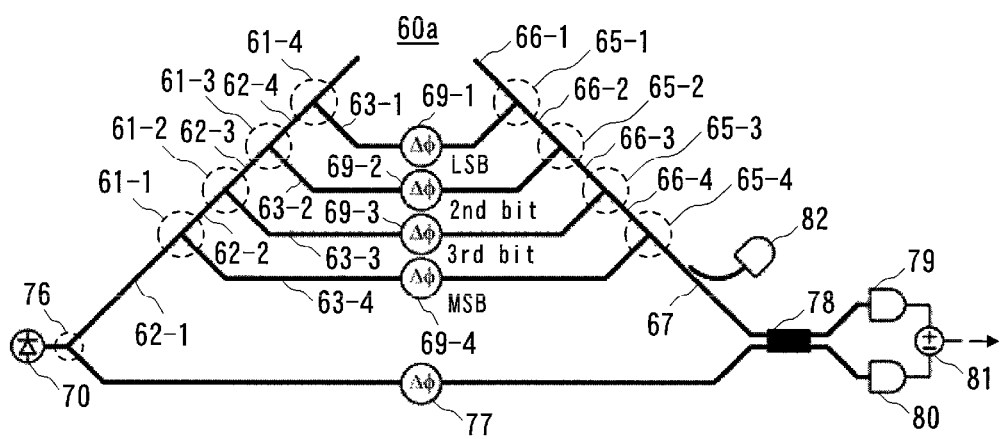
FIG. 21 is a block diagram depicting a configuration of the simulation target optical DAC according to Embodiment 7 of the present invention.
Figure 22:
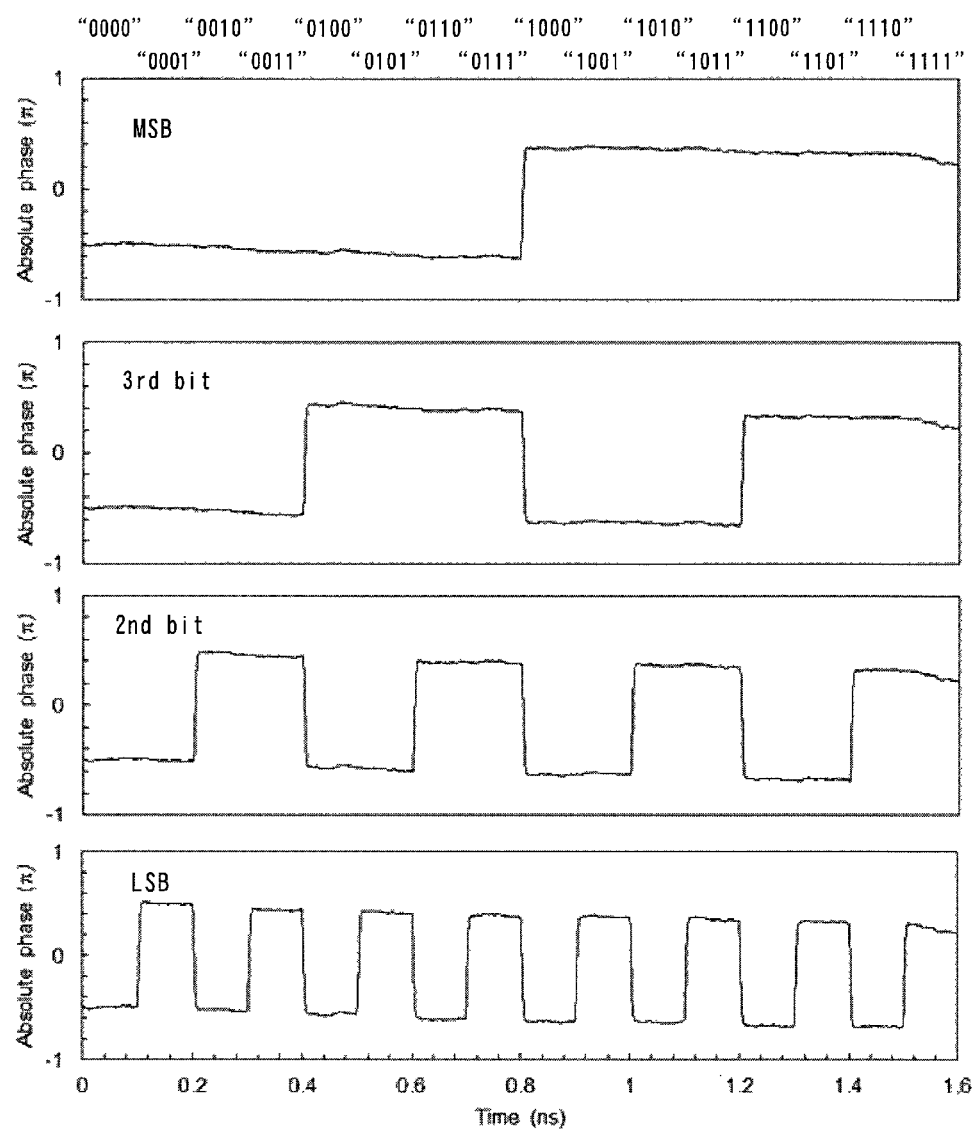
FIG. 22 shows graphs depicting a result of simulating the temporal change of the absolute phase of the optical signal of each bit in the configuration in FIG. 21.

FIG. 22 is a result of simulating the temporal change of the absolute phase of the optical signal of each bit in the configuration of FIG. 21. Since Embodiment 7 is a phase modulation system, the phase difference between each bit (relative phase) is modulated to 0/$\pi$. There is a four time (6 dB) light intensity difference between each bit, but the light intensity of each bit is constant with respect to time. The absolute phase fluctuates without maintaining the initial phase, since the line width of the laser light is 10 MHz, but the relative phase between bits is maintained at either 0 or $\pi$, hence all bits share the same laser light.

Figure 23:
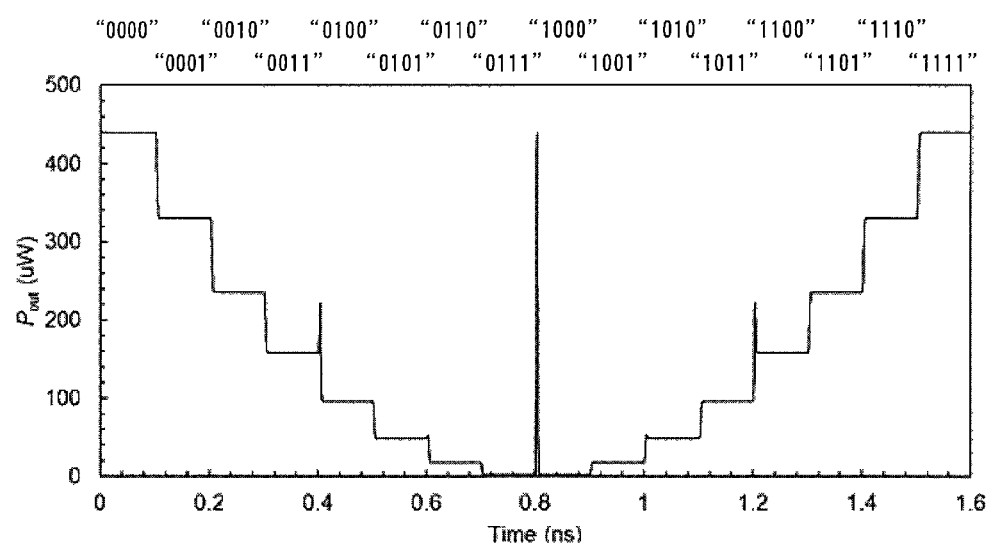
FIG. 23 is a graph depicting a result of simulating the temporal change of the intensity of the optical signal detected by a photodetector in the configuration in FIG. 21.
Figure 24:
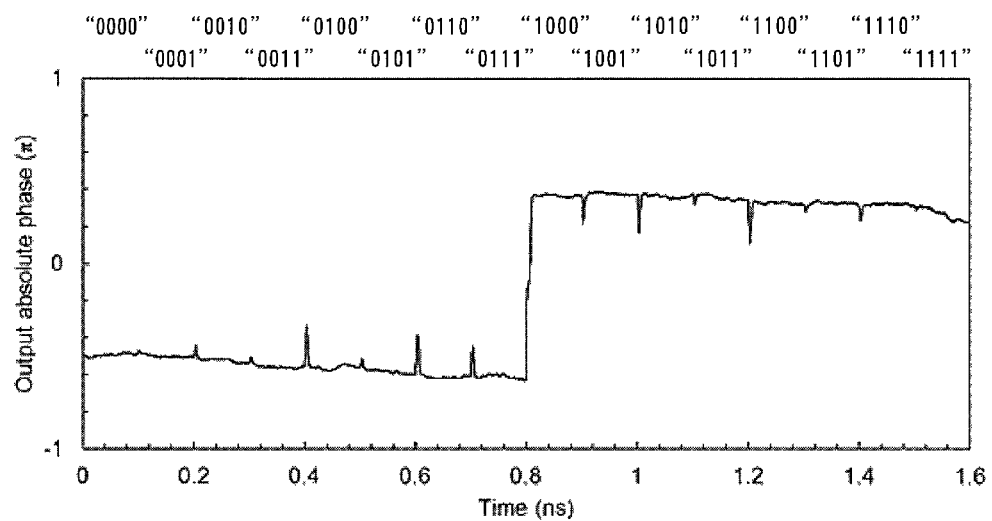
FIG. 24 is a graph depicting a result of simulating the temporal change of the absolute phase of the optical signal detected by a photodetector in the configuration in FIG. 21.

FIG. 23 is a result of simulating the temporal change of the intensity $P_{out}$ of the optical signal acquired when 100% light is coupled with the photodetector 82 disposed on the optical waveguide 67 in FIG. 21, and FIG. 24 is a result of simulating the temporal change of the absolute phase of the optical signal detected by the photodetector 82. The intensity $P_{out}$ of the optical signal is symmetrical with respect to the boundary between the electric digital signals "0111" and "1000", but the absolute phase is reversed at this boundary.

Figure 25:
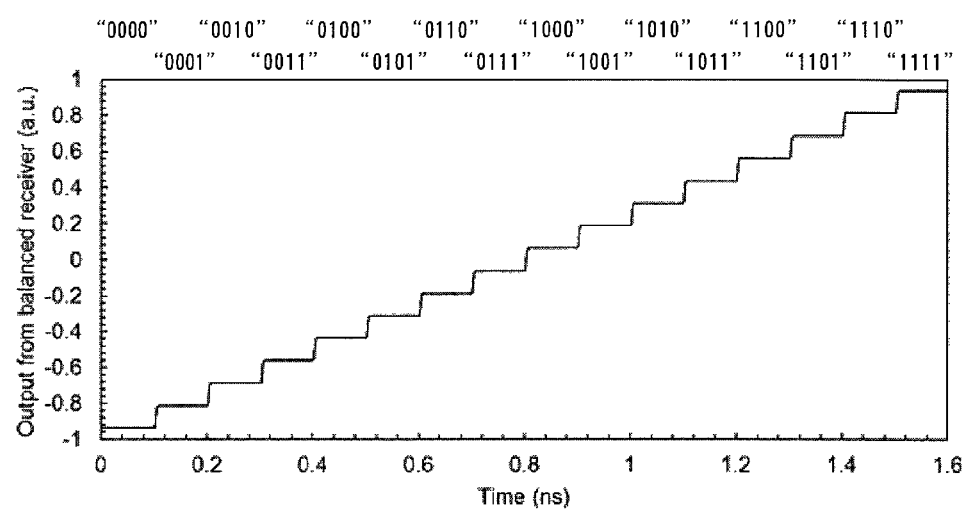
FIG. 25 is a graph depicting a result of simulating the temporal charge of the intensity of an electric signal output from a subtracter in the configuration of FIG. 21.

FIG. 25 is a result of simulating the temporal change of the electric signal intensity output from the subtracter 81 in FIG. 21. The positive/negative electric field amplitude of the optical signal is detected by the homodyne detection, and it is confirmed that output increases linearly with respect to the increase of the digital input.

In Embodiment 7, a case of applying the phase modulation system to Embodiment 6 was described, but the phase modulation system may be applied to Embodiments 1 to 5.

Figure 26:
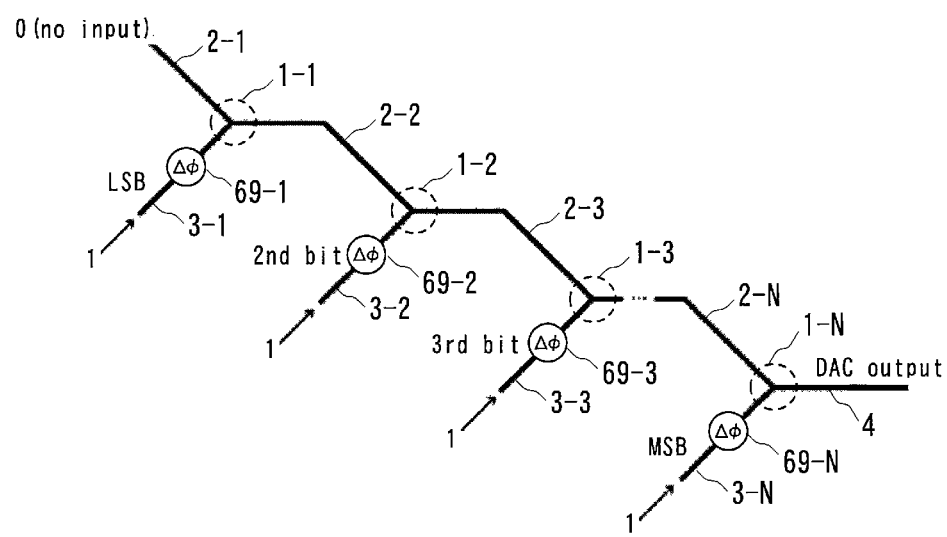
FIG. 26 is a block diagram depicting a configuration in the case of applying a phase modulation system to the N-bit optical DAC according to Embodiments 1 and 5 of the present invention.
Figure 27:
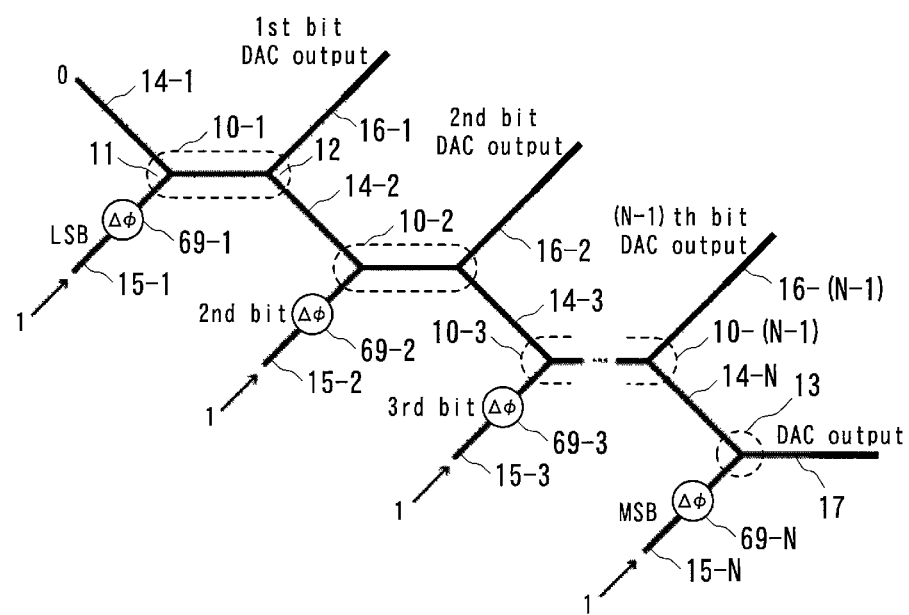
FIG. 27 is a block diagram depicting a configuration in the case of applying the phase modulation system to the N-bit optical DAC according to Embodiment 2 of the present invention.
Figure 28:
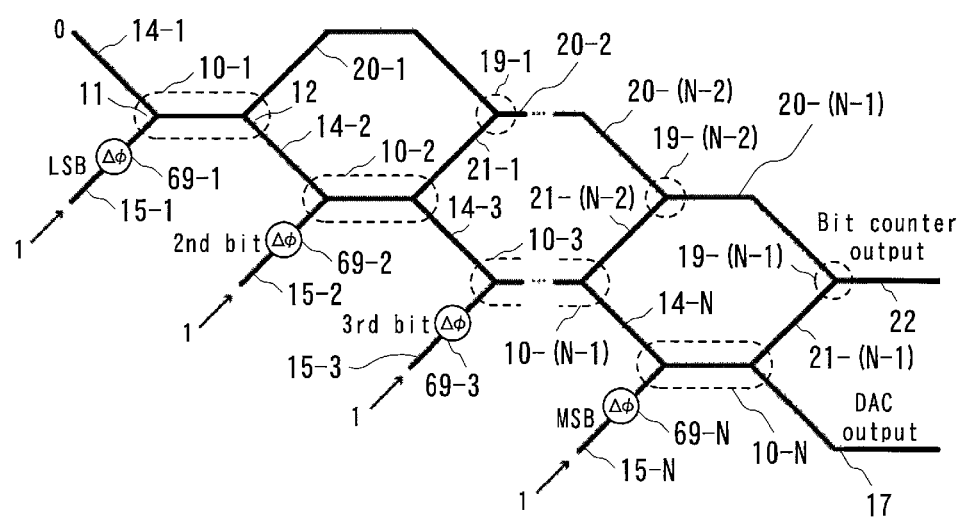
FIG. 28 is a block diagram depicting a configuration in the case of applying the phase modulation system to the N-bit optical DAC according to Embodiment 3 of the present invention.

FIG. 26 indicates a configuration in the case of applying the phase modulation system to Embodiments 1 and 5, FIG. 27 indicates a configuration in the case of applying the phase modulation system to Embodiment 2, and FIG. 28 indicates a configuration in the case of applying the phase modulation system to Embodiment 3. As mentioned above, coherent detection is essential in the phase modulation system, but in FIG. 26 to FIG. 28, the configuration related to homodyne detection (coherent detection unit 31 and Y branching element 33 in FIG. 13, and Y branching element 76, phase shifter 77, 3 dB coupler 78, photodetectors 79 and 80, and subtracter 81 in FIG. 16(D)) is omitted.

Embodiment 8

In Embodiment 4, all the Y coupling elements 1-1 to 1-N in Embodiments 1 and 5 are replaced with the bias port-included Y coupling elements, and the Y coupling elements 11 and the Y coupling elements 13 of all the Y coupling/Y branching elements 10-1 to 10-N in Embodiments 2 and 3 are replaced with the bias port-included Y coupling elements. Similarly, all the Y coupling elements 65-1 to 65-N in Embodiments 6 and 7 may be replaced with the bias port-included Y coupling elements.

Figure 29:
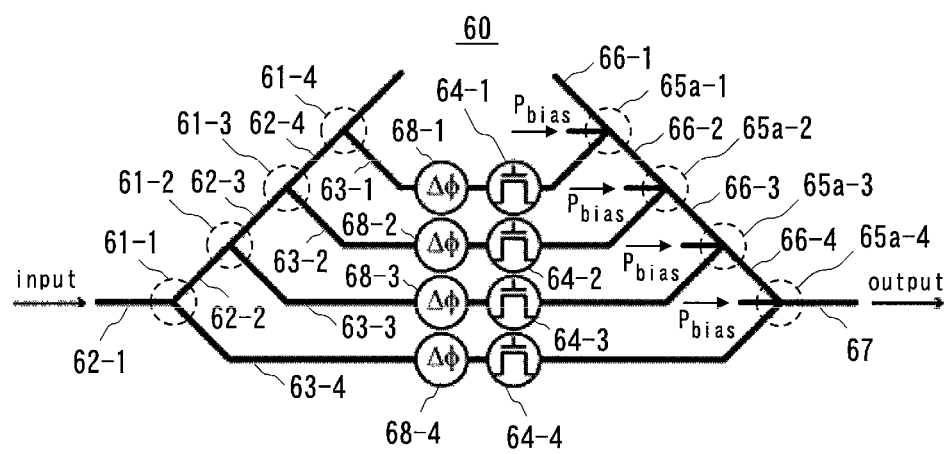
FIG. 29 is a block diagram depicting a configuration of an N-bit optical DAC according to Embodiment 8.
Figure 30:
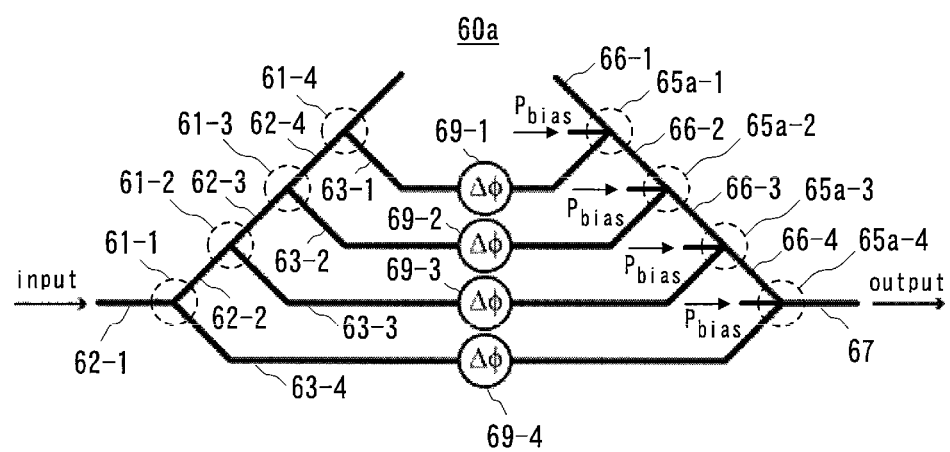
FIG. 30 is a block diagram depicting another configuration of the N-bit optical DAC according to Embodiment 8.

FIG. 29 indicates a configuration in the case where the Y coupling elements 65-1 to 65-N in Embodiment 6 are replaced with the bias port-included Y coupling elements 65a-1 to 65a-N, and FIG. 30 indicates a configuration in the case where the Y coupling elements 65-1 to 65-N in Embodiment 7 are replaced with the bias port-included Y coupling elements 65a-1 to 65a-N. Similarly, in the configurations illustrated in FIG. 26 to FIG. 28, the Y coupling elements 1-1 to 1-N and the Y coupling elements 11 and the Y coupling elements 13 of the Y coupling/Y branching elements 10-1 to 10-N may be replaced with the bias port-included Y coupling elements.

Figure 31:
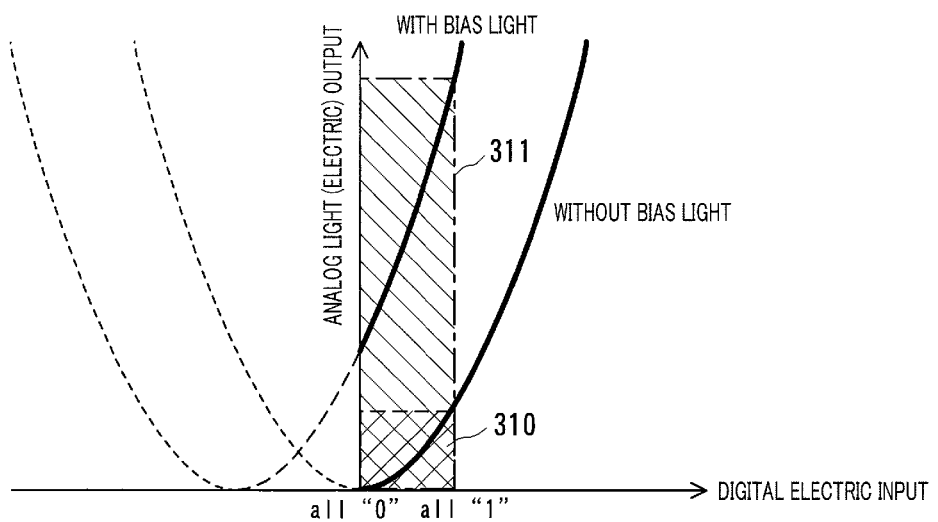
FIG. 31 is a diagram depicting an effect of inputting a bias light to a bias port of the Y coupling element.

The essential meaning of inputting the bias light to the bias port of the Y coupling element is to provide offset to the light intensity, so as to improve linearity between the input digital signal and the output of the optical DAC. FIG. 31 is a diagram depicting the relationship between the input digital signal and the intensity of an optical signal detected by the photodetector 82 of the optical DAC, where 310 indicates the operation region of the optical DAC in the case of not inputting the bias light, and 311 indicates the operation region of the optical DAC in the case of inputting the bias light.

Therefore any one of the Y coupling elements disposed before the photodetector may be replaced with the bias port-included Y coupling element. In concrete terms, any one of the Y coupling elements 1-1 to 1-N in FIG. 1, FIG.

13 of FIG. 26 may be replaced with the bias port-included Y coupling element, or either one of the Y coupling element 11 and the Y coupling element 13 of the Y coupling/Y branching elements 10-1 to 10-N in FIG. 3, FIG. 5, FIG. 27 or FIG. 28 may be replaced with the bias port-included Y coupling element, or any one of the Y coupling elements 65-1 to 65-N in FIG. 14 or FIG. 20 may be replaced with the bias port-included Y coupling element.

Figure 32:
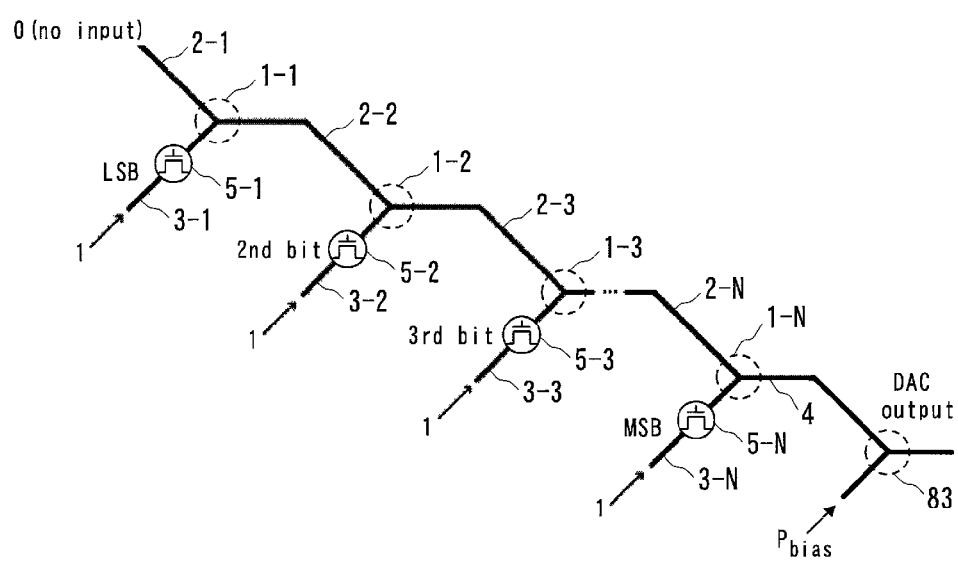
FIG. 32 is a block diagram depicting a configuration in a case of adding the Y coupling element in the final stage of the N-bit optical DAC according to Embodiments 1 and 5 of the present invention.
Figure 33:
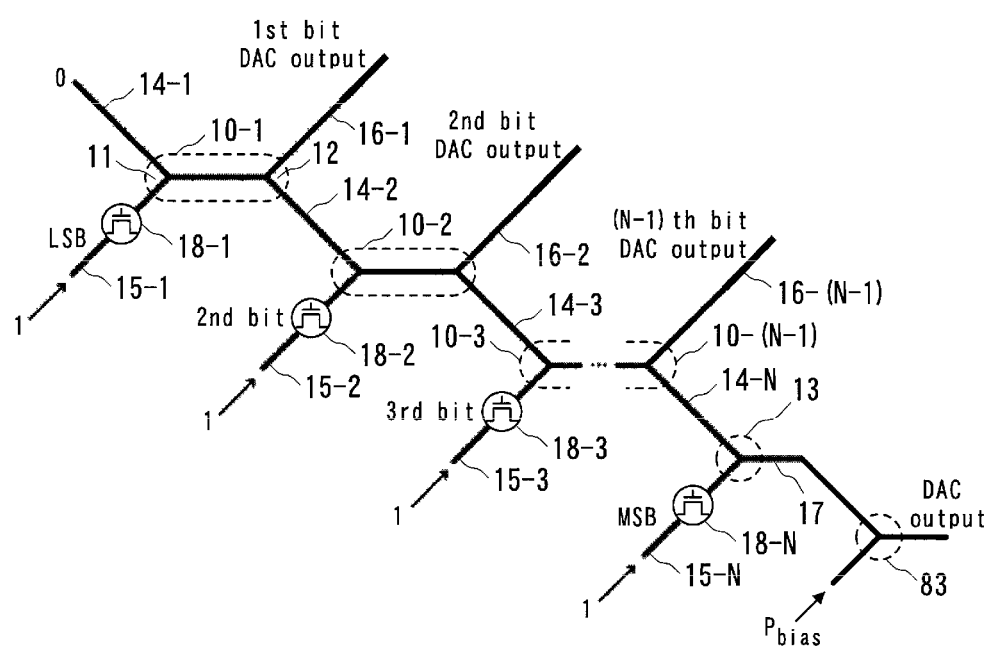
FIG. 33 is a block diagram depicting a configuration in a case of adding the Y coupling element in the final stage of the N-bit optical DAC according to Embodiment 2 of the present invention.
Figure 34:
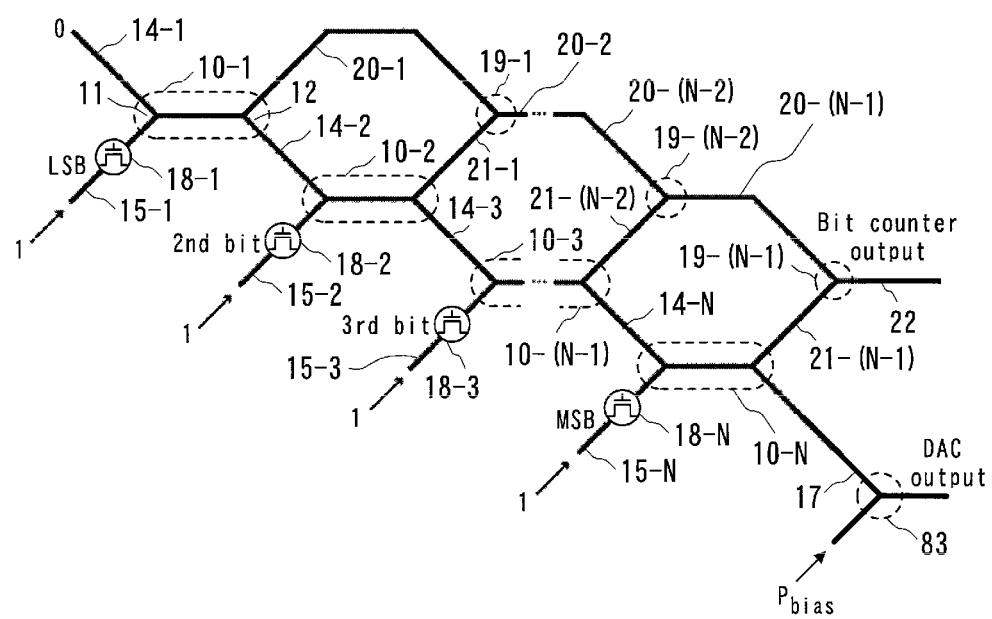
FIG. 34 is a block diagram depicting a configuration in a case of adding the Y coupling element in the final stage of the N-bit optical DAC according to Embodiment 3 of the present invention.
Figure 35:
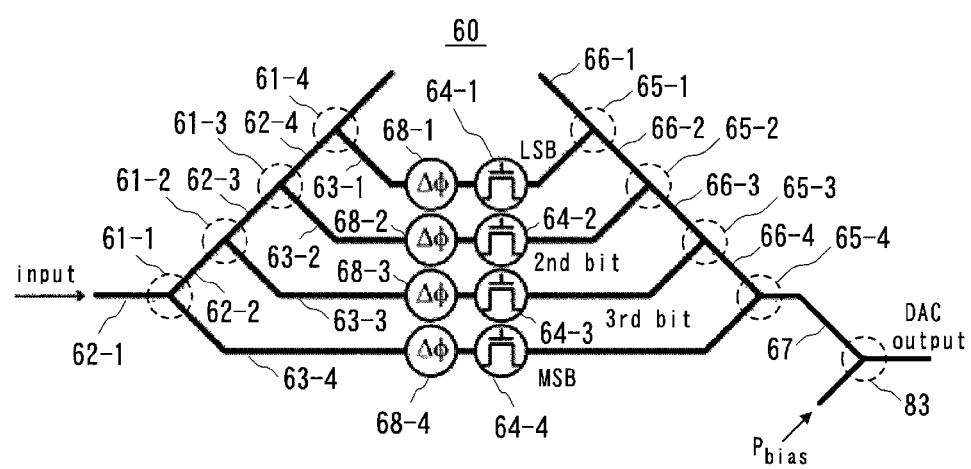
FIG. 35 is a block diagram depicting a configuration in a case of adding the Y coupling element in the final stage of the N-bit optical DAC according to Embodiment 6 of the present invention.

Further, one Y coupling element may be added in the final stage, so as to input the bias light to this Y coupling element. FIG. 32 indicates a configuration in the case of adding the Y coupling element 83 in the final stage of the optical DAC in Embodiment 1 or 5, FIG. 33 indicates a configuration in the case of adding the Y coupling element 83 in the final stage of the optical DAC in Embodiment 2, FIG. 34 indicates a configuration in the case of adding the Y coupling element 83 in the final stage of the optical DAC in Embodiment 3, and FIG. 35 indicates a configuration in the case of adding the Y coupling element 83 in the final stage of the optical DAC in FIG. 6. To change the configurations in FIG. 32 to FIG. 35 into a phase modulation system, the optical intensity modulators 5-1 to 5-N, 18-1 to 18-N and 64-1 to 64-N are replaced with the optical phase modulators.

INDUSTRIAL APPLICABILITY

Embodiments of the present invention can be applied to a technique to convert an electric digital signal into an analog signal using an optical circuit, for example.

REFERENCE SIGNS LIST 1, 11, 13, 19, 65, 74, 83 Y coupling element
1a, 65a Bias port-included Y coupling element
2 to 4, 14 to 17, 20 to 22, 34, 36, 37, 40 to 43, 50, 62, 63, 66, 67, 102 to 105, 202 to 205 Optical waveguide
5, 18, 64 Optical intensity modulator
6, 23 to 25, 53, 54, 71, 75, 79, 80, 82 Photodetector
10 Y coupling/Y branching element
12, 33, 35, 38, 39, 44 to 47, 61, 72, 76 Y branching element
30 Optical DAC computing unit
31 Coherent detection unit
32, 70 Continuous laser light source
48-1 to 48-8, 51, 68, 73, 77 Phase shifter
52, 78 3 dB coupler
60, b0a N-bit optical DAC
69 Optical phase modulator
81 Subtracter
101, 201 Substrate.

The invention claimed is:

1. An optical computing device, comprising:
cascade-connected N elements, wherein N is an integer greater than or equal to two, and wherein each of the N elements comprises:
  a first optical input port and a second optical input port, wherein the first optical input port and the second optical input port receive one or two signal lights, wherein no light is input to the first optical input port or a signal light from a respective first output port of a previous stage of the N elements is input to the first optical input port; and
  a first output port;
N optical modulators, wherein each of the N optical modulators individually modulate a continuous light to a respective second optical input port of a respective element of the N elements in accordance with respective bits of an N-bit electric digital signal to generate a signal light for the respective second optical input port, wherein an output light acquired from a final element in a final stage of the N elements is at least part of a computing result;
a third optical input port receiving the output light from the final element in the final stage of the N elements;
a fourth optical input port receiving a bias light having a fixed intensity; and
a third output port, wherein an output light acquired from the third output port is regarded as an N-th bit digital analog computing result.

2. The optical computing device according to claim 1, wherein each of the N elements is a coupling element.

3. The optical computing device according to claim 1, wherein each of the N elements is a coupling or branching element.

4. The optical computing device according to claim 3, wherein:
a first element of the N elements is a coupling element;
each of the N elements other than the first element further comprises a second output port;
the N elements are cascade-connected such that for each of the N elements other than a second element of the N elements, the respective first output port of the previous stage of the N elements is input to the first optical input port, wherein the previous stage of the N elements is an immediately previous stage of the N elements, and wherein the second element is a most upstream element of the N elements;
the N optical modulators individually modulate N continuous lights having a same wavelength; and
a respective output light from a respective second output port of each of the N elements other than the first element and the output light acquired from the third output port is the computing result.

5. The optical computing device of claim 4, wherein the first element of the N elements is the final element in the final stage of the N elements.

6. The optical computing device according to claim 3, wherein:
each of the N elements comprises a second output port;
the N elements are cascade-connected such that for each of the N elements other than a first element of the N elements, the respective first output port of the previous stage of the N elements is input to the first optical input port, wherein the previous stage of the N elements is an immediately previous stage of the N elements, and wherein the first element is a most upstream element of the N elements;
the N optical modulators individually modulate N continuous lights having a same wavelength; and
the optical computing device further comprises:
  cascade-connected N−1 second elements, wherein each of the N−1 second elements comprises:
    a fifth optical input port, wherein the fifth optical input port receives a signal light from a respective second output port of a respective one of the N elements;
    a sixth optical input port, wherein a signal light from a respective fifth output port of an immediately previous stage of the N−1 second elements is input to the sixth optical input port; and
    a fifth output port; and
  an output light acquired from a final second element in a final stage of the N−1 second elements is a N-bit counter computing result.

7. The optical computing device according to claim 1, wherein:
the N elements are cascade-connected such that for each of the N elements other than a first element of the N elements, the respective first output port of the previous stage of the N elements is input to the first optical input port, wherein the previous stage of the N elements is an immediately previous stage of the N elements, and wherein the first element is a most upstream element of the N elements; and
the N optical modulators individually modulate N continuous lights having a same wavelength.

8. The optical computing device according to claim 1, wherein:
the N elements are cascade-connected such that for each of the N elements other than a first element of the N elements, a respective first output port of an immediately previous stage of the N elements is input to the first optical input port, wherein the first element is a most upstream element of the N elements;
the optical computing device further includes cascade-connected N branching elements, wherein each of the N branching elements comprises:
a fifth optical input port;
a second optical output port; and
a fifth optical output port;
the N branching elements are cascade-connected such that for each of the N branching elements other than a first branching element of the N branching elements, a respective second output port of an immediately previous stage of the N branching elements is input to the fifth optical input port, wherein the first branching element is a most upstream branching element of the N branching elements;
a single continuous light is input to the fifth optical input port of the first branching element; and
output lights acquired from the fifth optical output port of each of the N branching elements are input to the N optical modulators.

9. The optical computing device according to claim 1, wherein at least one of N elements further comprises a bias port to which a bias light having a fixed intensity is input, wherein the bias port is different than the first optical input port and the second optical input port.

10. The optical computing device according to claim 1, wherein the N optical modulators are optical intensity modulators.

11. The optical computing device according to claim 1, wherein the N optical modulators are optical phase modulator, wherein the optical computing device further comprises a coherent detector that detects electric signals after digital analog conversion, and wherein the coherent detector comprises:
a phase shifter that adjusts a phase difference between an N-bit digital analog computing result and a reference light, the reference light has a same wavelength as the N-bit digital analog computing result, and the same wavelength is $\pi/2$;
a coupler that:
couples the N-bit digital analog computing result and the reference light into a coupled light;
equally divides the coupled light into two divided lights; and
outputs the two divided lights;
a first photo detector that converts a first divided light of the two divided lights into a first electric signal;
a second photodetector that converts a second divided light of the two divided lights into a second electric signal; and
a subtracter that determines a difference between the first electric signal and the second electrical signal.

12. An optical computing device, comprising:
cascade-connected N elements, wherein N is an integer greater than or equal to two, and wherein each of the N elements comprises:
a first optical input port and a second optical input port, wherein the first optical input port and the second optical input port receive one or two signal lights, wherein no light is input to the first optical input port or a signal light from a respective first output port of a previous stage of the N elements is input to the first optical input port; and
a first output port; and
N optical modulators, wherein each of the N optical modulators individually modulate a continuous light to a respective second optical input port of a respective element of the N elements in accordance with respective bits of an N-bit electric digital signal to generate a signal light for the respective second optical input port, wherein an output light acquired from a final element in a final stage of the N elements is at least part of a computing result,
wherein each of the N elements is a coupling or branching element,
wherein a first element of the N elements is a coupling element,
wherein each of the N elements other than the first element further comprises a second output port,
wherein the N elements are cascade-connected such that for each of the N elements other than a second element of the N elements, the respective first output port of the previous stage of the N elements is input to the first optical input port, wherein the previous stage of the N elements is an immediately previously stage of the N elements, and wherein the second element is a most upstream element of the N elements,
wherein N optical modulators individually modulate N continuous lights having a same wavelength, and
wherein a respective output light from a respective second output port of each of the N elements other than the first element and the output light acquired from the final element in the final stage of the N elements is the computing result.

13. The optical computing device of claim 12, wherein the first element of the N elements is the final element in the final stage of the N elements.

14. An optical computing device, comprising:
cascade-connected N elements, wherein N is an integer greater than or equal to two, and wherein each of the N elements comprises:
a first optical input port and a second optical input port, wherein the first optical input port and the second optical input port receive one or two signal lights, wherein no light is input to the first optical input port or a signal light from a respective first output port of a previous stage of the N elements is input to the first optical input port; and
a first output port; and
N optical modulators, wherein each of the N optical modulators individually modulate a continuous light to a respective second optical input port of a respective element of the N elements in accordance with respective bits of an N-bit electric digital signal to generate a signal light for the respective second optical input port,
wherein an output light acquired from a final element in a final stage of the N elements is at least part of a computing result,
wherein each of the N elements is a coupling or branching element,
wherein each of the N elements comprises a second output port,
wherein the N elements are cascade-connected such that for each of the N elements other than a first element of the N elements, the respective first output port of the previous stage of the N elements is input to the first optical input port, wherein the previous stage of the N elements is an immediately previous stage of the N elements, and wherein the first element is a most upstream element of the N elements,
wherein the N optical modulators individually modulate N continuous lights having a same wavelength,
wherein the optical computing device further comprises:
  cascade-connected N−1 second elements, wherein each of the N−1 second elements comprises:
    a third optical input port, wherein the third optical input port receives a signal light from a respective second output port of a respective one of the N elements;
    a fourth optical input port, wherein a signal light from a respective third output port of an immediately previous stage of the N−1 second elements is input to the fourth optical input port; and
    a third output port,
the output light acquired from the final element in the final stage of the N elements is a N-bit digital analog computing result, and
an output light acquired from a final second element in a final stage of the N−1 second elements is a N-bit counter computing result.

* * * * *